US012293770B2

(12) United States Patent
Zhu et al.

(10) Patent No.: US 12,293,770 B2
(45) Date of Patent: May 6, 2025

(54) VOICE SIGNAL DEREVERBERATION PROCESSING METHOD AND APPARATUS, COMPUTER DEVICE AND STORAGE MEDIUM

(71) Applicant: TENCENT TECHNOLOGY (SHENZHEN) COMPANY LIMITED, Guangdong (CN)

(72) Inventors: Rui Zhu, Shenzhen (CN); Juan Juan Li, Shenzhen (CN); Yan Nan Wang, Shenzhen (CN); Yue Peng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 17/685,042

(22) Filed: Mar. 2, 2022

(65) Prior Publication Data

US 2022/0230651 A1 Jul. 21, 2022

Related U.S. Application Data

(63) Continuation of application No. PCT/CN2021/076465, filed on Feb. 10, 2021.

(30) Foreign Application Priority Data

Apr. 1, 2020 (CN) ......................... 202010250009.3

(51) Int. Cl.
*G10L 25/12* (2013.01)
*G10L 21/0232* (2013.01)
(Continued)

(52) U.S. Cl.
CPC .......... *G10L 21/0232* (2013.01); *G10L 25/12* (2013.01); *G10L 25/18* (2013.01);
(Continued)

(58) Field of Classification Search
CPC ..... G10L 21/0232; G10L 25/12; G10L 25/18; G10L 25/21; G10L 25/30;
(Continued)

(56) References Cited

U.S. PATENT DOCUMENTS

| | | | |
|---|---|---|---|
| 2012/0082323 | A1 | 4/2012 | Sato |
| 2013/0231923 | A1 | 9/2013 | Zakarauskas et al. |

(Continued)

FOREIGN PATENT DOCUMENTS

| | | | |
|---|---|---|---|
| CN | 102739886 | A | 10/2012 |
| CN | 102750956 | A | 10/2012 |

(Continued)

OTHER PUBLICATIONS

Saeed Mosayyebpour et al., "Neural-Network Supervised Maximum Likelihood-based on-line Dereverberation," (Year: 2018).*

(Continued)

*Primary Examiner* — Paras D Shah
*Assistant Examiner* — Mulugeta Tuji Dugda
(74) *Attorney, Agent, or Firm* — Sughrue Mion, PLLC

(57) ABSTRACT

A speech signal dereverberation processing method includes extracting an amplitude spectrum feature and a phase spectrum feature of a current frame in an original speech signal, extracting subband amplitude spectrums from the amplitude spectrum feature corresponding to the current frame, determining, based on the subband amplitude spectrums and by using a first reverberation predictor, a reverberation strength indicator corresponding to the current frame, and determining, based on the subband amplitude spectrums and the reverberation strength indicator, and by using a second reverberation predictor, a clean speech subband spectrum corresponding to the current frame.

20 Claims, 10 Drawing Sheets

(51) Int. Cl.
*G10L 25/18* (2013.01)
*G10L 25/21* (2013.01)
*G10L 25/30* (2013.01)
*G10L 21/0208* (2013.01)

(52) U.S. Cl.
CPC .............. *G10L 25/21* (2013.01); *G10L 25/30* (2013.01); *G10L 2021/02082* (2013.01)

(58) Field of Classification Search
CPC ....... G10L 2021/02082; G10L 21/0208; G10L 21/0324
See application file for complete search history.

(56) References Cited

U.S. PATENT DOCUMENTS

| | | | | |
|---|---|---|---|---|
| 2015/0149160 | A1* | 5/2015 | Lou | G10L 21/0208 704/226 |
| 2018/0308503 | A1* | 10/2018 | Kaskari | G10L 21/0232 |
| 2019/0251985 | A1* | 8/2019 | Yu | G06N 3/08 |

FOREIGN PATENT DOCUMENTS

| | | | | | |
|---|---|---|---|---|---|
| CN | 106157964 | A | | 11/2016 | |
| CN | 106340292 | A | | 1/2017 | |
| CN | 108986799 | A | | 12/2018 | |
| CN | 109119090 | A | * | 1/2019 | G10L 21/02 |
| CN | 109243476 | A | | 1/2019 | |
| CN | 109997186 | A | * | 7/2019 | G01H 7/00 |
| CN | 110148419 | A | | 8/2019 | |
| CN | 110211602 | A | | 9/2019 | |
| CN | 111489760 | A | | 8/2020 | |
| WO | WO-2020107455 | A1 | * | 6/2020 | G10L 21/02 |

OTHER PUBLICATIONS

International Search Report for PCT/CN2021/076465 dated May 17, 2021.
Written Opinion for PCT/CN2021/076465 dated May 17, 2021.

* cited by examiner (a) (b)

VOICE SIGNAL DEREVERBERATION PROCESSING METHOD AND APPARATUS, COMPUTER DEVICE AND STORAGE MEDIUM

CROSS-REFERENCE TO RELATED APPLICATION(S)

This application is a continuation application of International Application No. PCT/CN2021/076465, filed on Feb. 10, 2021, which claims priority to Chinese Patent Application No. 202010250009.3, filed with the China National Intellectual Property Administration on Apr. 1, 2020, the entire contents of which are incorporated by reference herein.

FIELD

The disclosure relates generally to the field of communication technologies, and specifically, to a speech signal dereverberation processing method and apparatus, a computer device, and a storage medium.

BACKGROUND

With the rapid development of computer communication technologies, a speech call technology based on Voice over Internet Protocol (VoIP) appears, and communication is carried out via the Internet, to perform communication functions such as a speech call and a multimedia conference. In a point-to-point call or an online multi-person conference call based on VoIP, because a speaker is far away from a microphone or an indoor acoustic environment is poor, reverberation is caused. As a result, a speech is unclear and speech call quality is affected.

Currently, in the related technology, history frame information of a previous time period is obtained, and reverberation information of a current frame is predicted based on linear predictive coding (LPC) prediction, an autoregressive model, a statistical model, and the like, to dereverberate a speech of a single channel. These manners are usually based on the assumption of statistical stationarity or short-term stationarity of a speech reverberation component, and rely on history frame information in reverberation estimation. Earlier reverberation including early reflected sound cannot be accurately estimated, and there is an error in reverberation degree estimation, resulting in lower accuracy of speech reverberation elimination.

SUMMARY

In accordance with an aspect of an example embodiment of the disclosure, a speech signal dereverberation processing method may include extracting an amplitude spectrum feature and a phase spectrum feature of a current frame in an original speech signal, extracting subband amplitude spectrums from the amplitude spectrum feature corresponding to the current frame, determining, based on the subband amplitude spectrums and by using a first reverberation predictor, a reverberation strength indicator corresponding to the current frame, determining, based on the subband amplitude spectrums and the reverberation strength indicator, and by using a second reverberation predictor, a clean speech subband spectrum corresponding to the current frame, and obtaining a dereverberated clean speech signal by performing signal conversion on the clean speech subband spectrum and the phase spectrum feature corresponding to the current frame.

In accordance with an aspect of an example embodiment of the disclosure, a speech signal dereverberation processing apparatus may include at least one memory configured to store computer program code, and at least one processor configured to access said computer program code and operate as instructed by said computer program code, said computer program code including first extracting code configured to cause the at least one processor to extract an amplitude spectrum feature and a phase spectrum feature of a current frame in an original speech signal, second extracting code configured to cause the at least one processor to extract subband amplitude spectrums from the amplitude spectrum feature corresponding to the current frame, first determining code configured to cause the at least one processor to determine, based on the subband amplitude spectrums and by using a first reverberation predictor, a reverberation strength indicator corresponding to the current frame, second determining code configured to cause the at least one processor to determine, based on the subband amplitude spectrums and the reverberation strength indicator, and by using a second reverberation predictor, a clean speech subband spectrum corresponding to the current frame, and obtaining code configured to cause the at least one processor to obtain a dereverberated clean speech signal by performing signal conversion on the clean speech subband spectrum and the phase spectrum feature corresponding to the current frame.

In accordance with an aspect of an example embodiment of the disclosure, a non-transitory computer-readable storage medium may store computer instructions that, when executed by at least one processor of a speech signal dereverberation processing device, cause the at least one processor to extract an amplitude spectrum feature and a phase spectrum feature of a current frame in an original speech signal, extract subband amplitude spectrums from the amplitude spectrum feature corresponding to the current frame, determine, based on the subband amplitude spectrums and by using a first reverberation predictor, a reverberation strength indicator corresponding to the current frame, determine, based on the subband amplitude spectrums and the reverberation strength indicator, and by using a second reverberation predictor, a clean speech subband spectrum corresponding to the current frame, and obtain a dereverberated clean speech signal by performing signal conversion on the clean speech subband spectrum and the phase spectrum feature corresponding to the current frame.

A speech signal dereverberation processing apparatus, including a speech signal processing module, configured to obtain an original speech signal; and extract an amplitude spectrum feature and a phase spectrum feature corresponding to a current frame in the original speech signal; a first reverberation prediction module, configured to extract subband amplitude spectrums from the amplitude spectrum feature corresponding to the current frame, and determine, according to the subband amplitude spectrums by using a first reverberation predictor, a reverberation strength indicator corresponding to the current frame; a second reverberation prediction module, configured to determine, according to the subband amplitude spectrums and the reverberation strength indicator by using a second reverberation predictor, a clean speech subband spectrum corresponding to the current frame; and a speech signal conversion module, configured to perform signal conversion on the clean speech subband spectrum and the phase spectrum feature corresponding to the current frame, to obtain a dereverberated clean speech signal.

A computer device, including a memory and a processor, where the memory stores a computer program; and when executing the computer program, the processor performs the following steps: obtaining an original speech signal; extracting an amplitude spectrum feature and a phase spectrum feature corresponding to a current frame in the original speech signal; extracting subband amplitude spectrums from the amplitude spectrum feature corresponding to the current frame, and determining, according to the subband amplitude spectrums by using a first reverberation predictor, a reverberation strength indicator corresponding to the current frame; determining, according to the subband amplitude spectrums and the reverberation strength indicator by using a second reverberation predictor, a clean speech subband spectrum corresponding to the current frame; and performing signal conversion on the clean speech subband spectrum and the phase spectrum feature corresponding to the current frame, to obtain a dereverberated clean speech signal.

A computer-readable storage medium, storing a computer program, and the computer program, when executed by a processor, implementing the following steps: obtaining an original speech signal; extracting an amplitude spectrum feature and a phase spectrum feature corresponding to a current frame in the original speech signal; extracting subband amplitude spectrums from the amplitude spectrum feature corresponding to the current frame, and determining, according to the subband amplitude spectrums by using a first reverberation predictor, a reverberation strength indicator corresponding to the current frame; determining, according to the subband amplitude spectrums and the reverberation strength indicator by using a second reverberation predictor, a clean speech subband spectrum corresponding to the current frame; and performing signal conversion on the clean speech subband spectrum and the phase spectrum feature corresponding to the current frame, to obtain a dereverberated clean speech signal.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

To make the objectives, technical solutions, and advantages of the disclosure clearer and more comprehensible, the disclosure is further elaborated in detail with reference to the accompanying drawings and embodiments. It is to be understood that the specific embodiments described herein are merely used for explaining the disclosure but are not intended to limit the disclosure.

Figure 1:
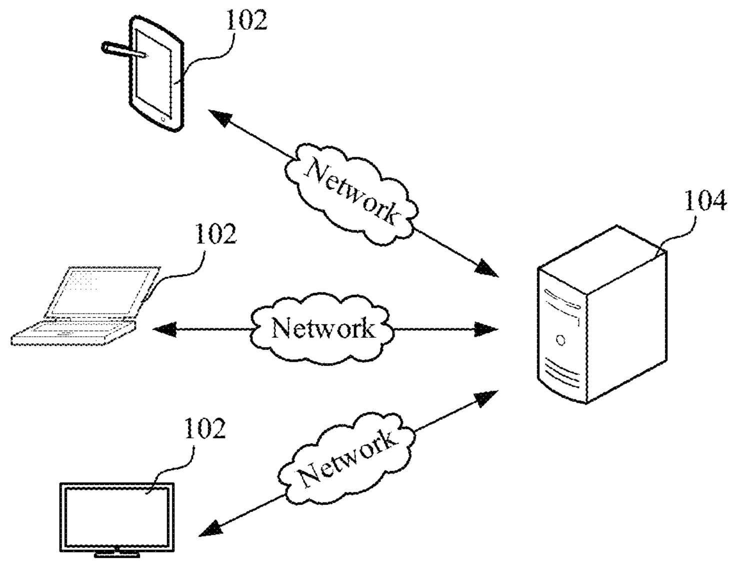
FIG. 1 is a diagram of an application environment of a speech signal dereverberation processing method according to an embodiment.

FIG. 1 is a diagram of an application environment of a speech signal dereverberation processing method according to an embodiment. A speech signal dereverberation processing method provided in the disclosure may be applied to an application environment shown in FIG. 1. A terminal 102 communicates with a server 104 through a network. The terminal 102 captures speech data recorded by a user. The terminal 102 or the server 104 obtains an original speech signal, and after extracting an amplitude spectrum feature and a phase spectrum feature of a current frame in the original speech signal, performs band division on the amplitude spectrum feature of the current frame, to extract corresponding subband amplitude spectrums. Reverberation strength prediction is performed on the subband-based subband amplitude spectrums by using a first reverberation predictor, such that a reverberation strength indicator of the current frame may be accurately predicted. Then, a clean speech subband spectrum of the current frame is further predicted with reference to the obtained reverberation strength indicator and the subband amplitude spectrums of the current frame by using a second reverberation predictor, such that a clean speech amplitude spectrum of the current frame may be accurately extracted and a corresponding clean speech signal may be obtained. The terminal 102 may be but is not limited to any personal computer, notebook computer, desktop computer, smartphone, tablet computer, and portable wearable device. The server 104 may be implemented by an independent server or a server cluster that includes a plurality of servers.

The solution provided in the embodiments of the disclosure relates to speech enhancement of artificial intelligence and other technologies. Key speech technologies (ST) include speech separation (SS), speech enhancement (SE), and automatic speech recognition (ASR) technologies. To make a computer capable of listening, seeing, speaking, and feeling is the future development direction of human-computer interaction, and speech has become one of the most promising human-computer interaction methods in the future.

The speech signal dereverberation processing method provided in the embodiments of the disclosure further may be applied to a cloud conference. A cloud conference is an efficient, convenient, and cost-effective conference form based on the cloud computing technology. A user only needs to perform a simple operation on an Internet interface to quickly and efficiently share a speech, a data file, and a video with teams and customers all over the world synchronously. A cloud conference service provider helps the user to operate complex technologies such as data transmission and processing in the conference.

Currently, domestic cloud conferences mainly focus on service content mainly in the mode of software as a service (SaaS), including service forms such as a telephone, a network, a video, and the like. A video conference based on cloud computing is called a cloud conference. In the cloud conference era, data transmission, processing, and storage are all performed by a computer resource of a video conference manufacturer, and a user no longer needs to purchase expensive hardware and install cumbersome software and only needs to open a browser to log into a corresponding interface to have an efficient remote conference.

A cloud conference system supports dynamic clustering deployment of multiple servers and provides multiple high-performance servers, which greatly improves conference stability, security, and availability. In recent years, video conferences are welcomed by many users and are widely applied in government, military, transportation, transport, finance, operators, education, enterprises, and other fields because of improved communication efficiency, reduced communication costs, and internal management upgrade. Undoubtedly, after cloud computing is applied, video conferences become more attractive in terms of convenience, speed, and ease of usage, and surely will be applied more widely.

The disclosure further provides an application scenario, which may be a speech call scenario and specifically may be a conference scenario. The conference scenario may be a speech conference scenario and further may be a video conference scenario. The foregoing speech signal dereverberation processing method is applied in the disclosure scenario. Specifically, the speech signal dereverberation processing method in this scenario is applied to a user terminal. An application of the speech signal dereverberation processing method in the disclosure scenario is as follows.

Figure 2:
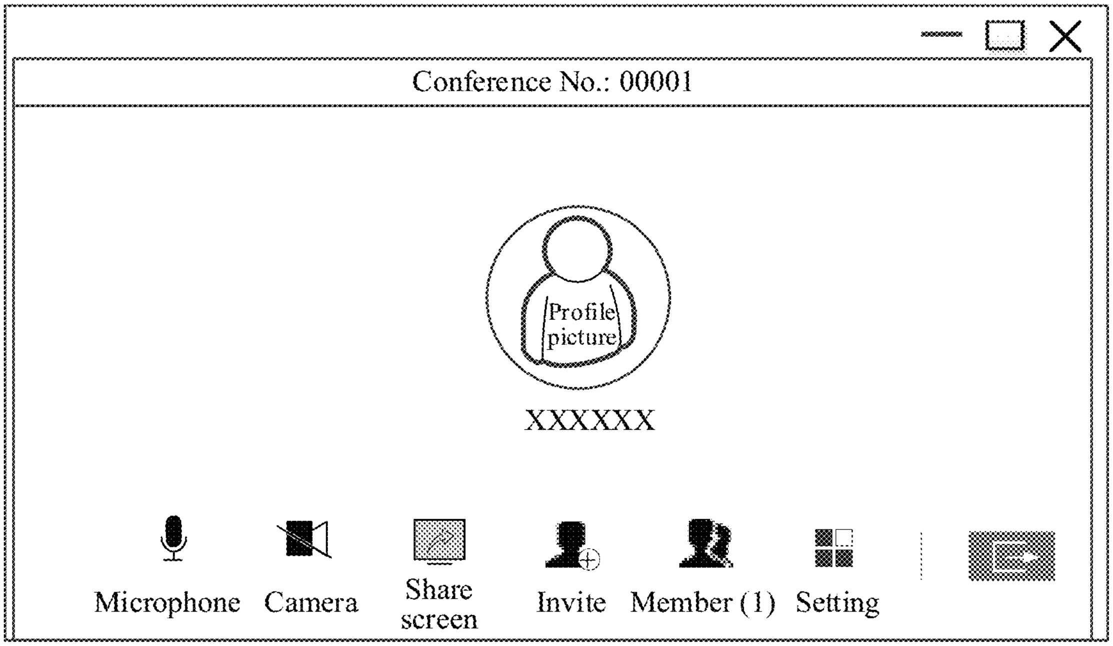
FIG. 2 is a diagram of a conference interface according to an embodiment.
Figure 11:
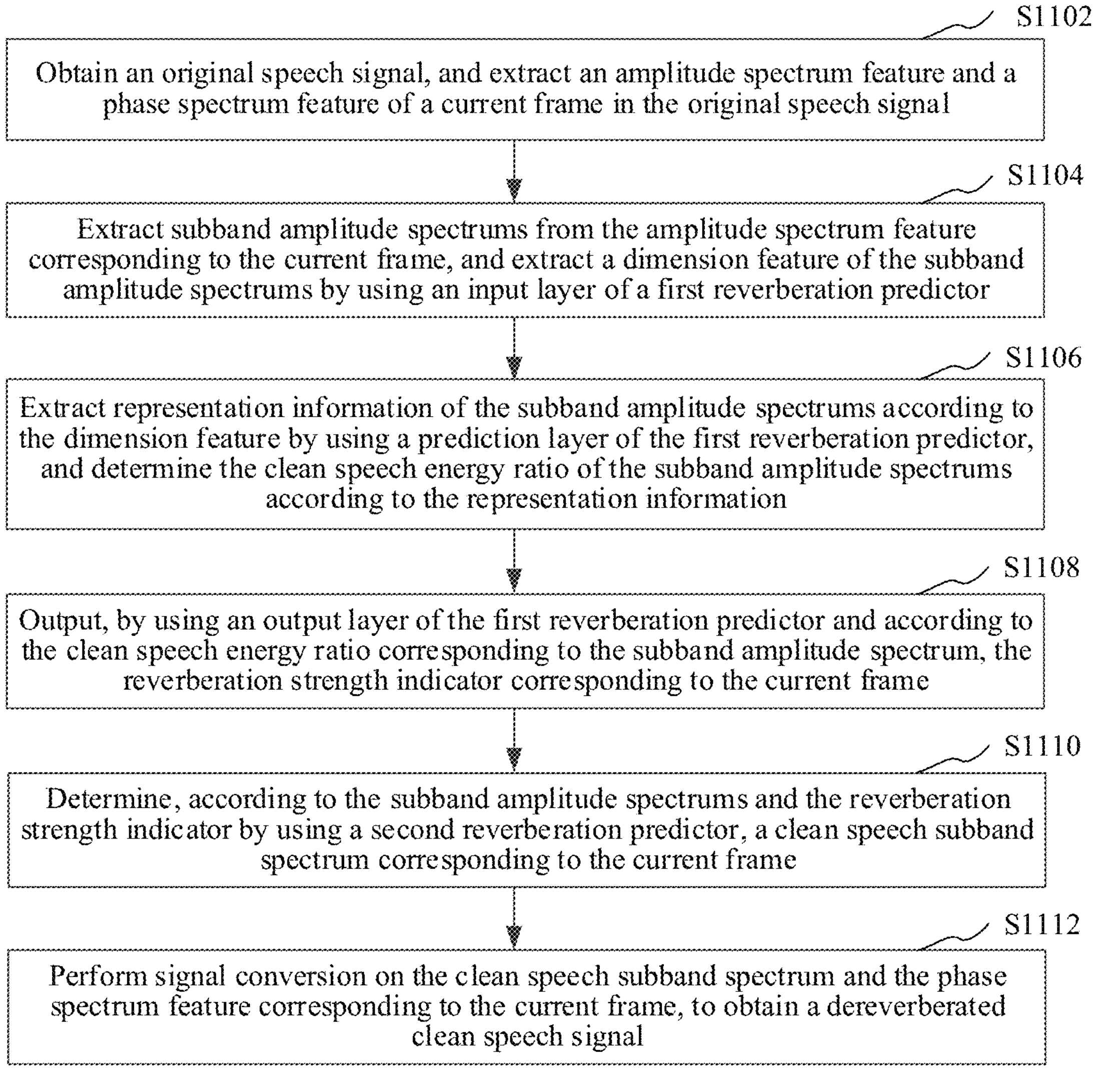
FIG. 11 is a flowchart of a speech signal dereverberation processing method according to an embodiment.

FIG. 2 is a diagram of a conference interface according to an embodiment. A user may initiate or participate in a speech conference on a corresponding user terminal, and after entering the conference on the user terminal, the user starts the conference. After entering the conference interface, a user terminal starts a conference. The conference interface includes some conference options, and may include options of microphone, camera, screen sharing, member, setting, and exiting a conference, as shown in FIG. 11. These options are used for setting various functions of a conference scenario.

Figure 3:
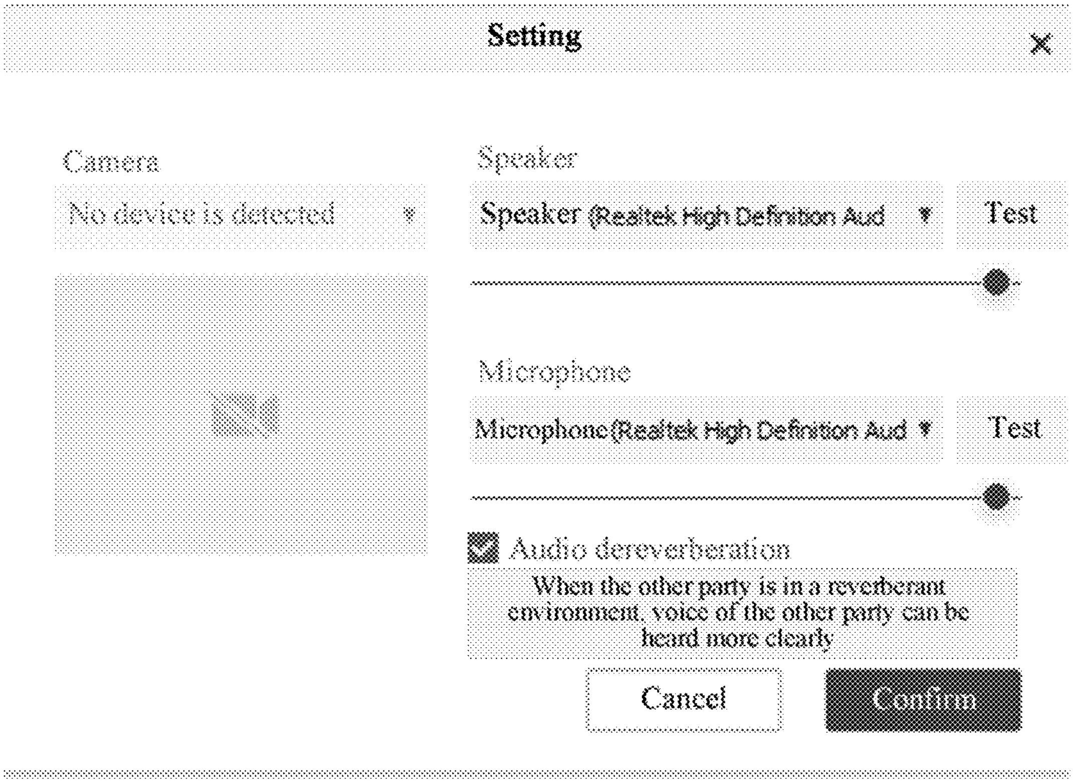
FIG. 3 is a diagram of an interface of setting a reverberation function according to an embodiment.

FIG. 3 is a diagram of an interface of setting a reverberation function according to an embodiment. When listening to a speech of the other party and finding that sound of the other party is muddy and reverberation is serious, a receiving-party user cannot clearly hear speech content. The receiving-party user may start a dereverberation function through a setting option in a conference interface of a conference application program of a user terminal. A reverberation function setting interface of a conference interface is shown in FIG. 3. A user may click a "setting" option, that is, a setting option in the conference interface shown in FIG. 2. In a reverberation function setting page shown in FIG. 3, an "audio dereverberation" option is selected to start an audio dereverberation function corresponding to "speaker". In this case, the speech dereverberation function built in the conference application program is enabled, and the user terminal performs dereverberation processing on received speech data.

The user terminal displays a communication configuration page in the conference interface, the displayed communication configuration page includes a dereverberation configuration option, and the user triggers the communication configuration page to perform dereverberation setting. The user terminal obtains a dereverberation request triggered by the dereverberation configuration option, and performs dereverberation processing on a currently obtained reverberated speech signal based on the dereverberation request. Specifically, a receiving-party user terminal receives an original speech signal sent by a sending-party terminal, and after preprocessing the original speech signal such as framing and windowing, extracts an amplitude spectrum feature and a phase spectrum feature of a current frame. The user terminal further performs band division on the amplitude spectrum feature of the current frame to extract corresponding subband amplitude spectrums, and performs reverberation strength prediction on the subband-based subband amplitude spectrums by using a first reverberation predictor. In this way, a reverberation strength indicator of the current frame may be accurately predicted. Then, a clean speech subband spectrum of the current frame is further predicted with reference to the obtained reverberation strength indicator and the subband amplitude spectrums of the current frame by using a second reverberation predictor, such that a clean speech amplitude spectrum of the current frame may be accurately extracted. The user terminal performs signal conversion on the clean speech subband spectrum and the phase spectrum feature, to obtain a dereverberated clean speech signal, and outputs the dereverberated clean speech signal through a speaker device of the user terminal. Therefore, when receiving speech data sent by the other party, the user terminal may eliminate a reverberation component in a speech of another user in sound played by a speaker or an earphone of the user, and reserve a clean speech in the speech of the another user. This effectively improves accuracy and efficiency of speech dereverberation and may effectively improve conference call experience.

Figure 4:
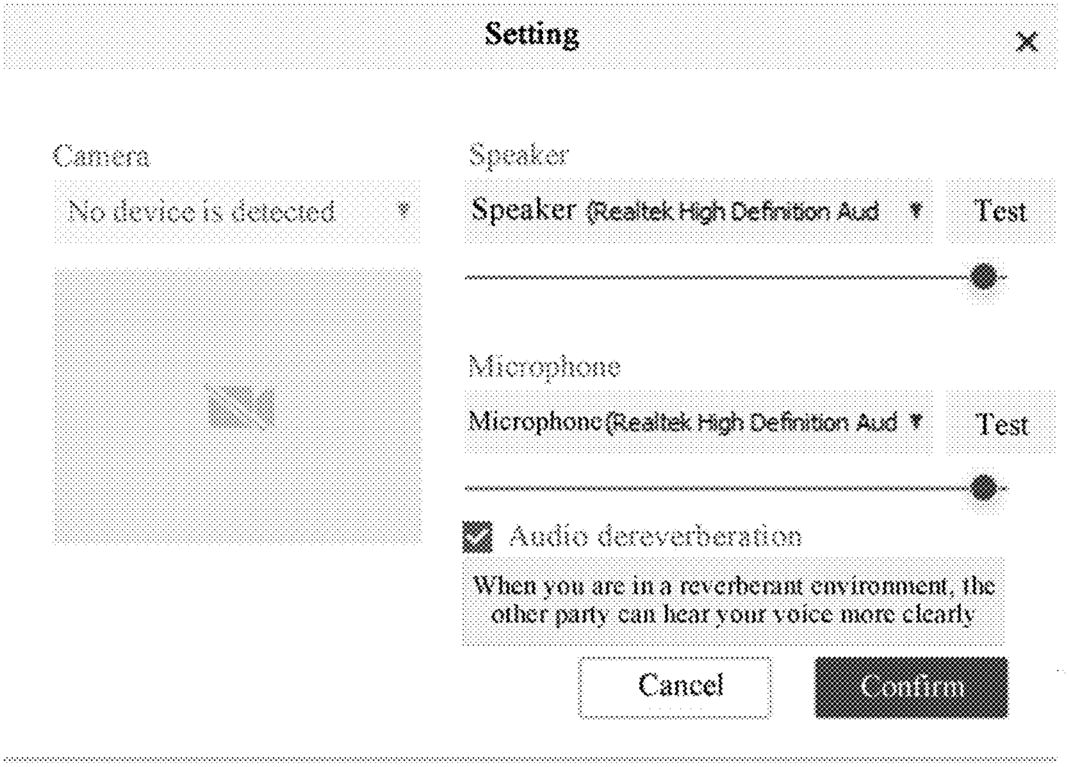
FIG. 4 is a diagram of an interface of setting a reverberation function according to an embodiment.

FIG. 4 is a diagram of an interface of setting a reverberation function according to an embodiment. In another application scenario, after entering a conference and speaks, a user finds that environment reverberation is serious or the other party feeds back that speech content cannot be heard. The user may further perform reverberation function configuration by using the setting option in the reverberation function setting interface shown in FIG. 12, to start the dereverberation function. That is, in a reverberation function setting interface shown in FIG. 4, an "audio dereverberation" option is selected to start an audio dereverberation function corresponding to “microphone”. In this case, a speech dereverberation function built in a conference application program is started, and the user terminal corresponding to the sending party performs dereverberation processing on recorded speech data. A dereverberation processing process is the same as the foregoing processing process. As a result, the user terminal may eliminate a reverberation component in the speech of the speech sending party captured by the microphone, extract a clean speech signal in the speech, and send the clean speech signal. Therefore, this effectively improves accuracy and efficiency of the speech dereverberation and may effectively improve conference call experience.

The disclosure further provides an application scenario, which is a speech call scenario and specifically may still be a speech conference or a video conference scenario. The foregoing speech signal dereverberation processing method is applied in the disclosure scenario. Specifically, application of the speech signal dereverberation processing method in the disclosure scenario is as follows.

In a multi-person conference, multiple user terminals communicate with a server to perform multi-terminal speech interaction, a user terminal sends a speech signal to the server, and the server transmits the speech signal to a corresponding receiving-party user terminal. Each user needs to receive speech streams of all other users, that is, an N-person conference, and each user needs to listen to other N−1 channels of speech data. Therefore, a stream control operation of audio mixing needs to be performed. In a multi-person conference, a speaking user may select to start dereverberation, such that the sending-party user terminal sends a dereverberated speech signal. A listening user may also start a dereverberation function on a corresponding receiving-party user terminal, such that the receiving-party user terminal receives a dereverberated sound signal. The server may also start dereverberation, such that the server performs dereverberation processing on speech data that passes by. When performing dereverberation processing, the server or the receiving-party user terminal usually mixes multiple channels of speech data into one channel of speech data, and then performs dereverberation processing on the mixed speech data, to save computing resources. Further, the server may also perform dereverberation processing on each channel of stream that is not mixed, or automatically determine whether the channel of stream has reverberation, and then determine whether to perform dereverberation processing.

In an embodiment, the server delivers all N−1 channels of data to a corresponding receiver-party user terminal. The corresponding receiver-party user terminal mixes the multiple channels of received speech data into one channel of speech data, performs dereverberation processing on the one channel of speech data, and then outputs the dereverberated channel of speech data through a speaker of the user terminal.

In another embodiment, the server mixes one channel or multiple channels of received speech data, that is, the server needs to mix N−1 channels of data into one channel of data, performs dereverberation processing on the mixed speech data, and then delivers the dereverberated speech data to a corresponding receiving-party user terminal. Specifically, after obtaining the original speech data uploaded by the sending-party user terminal, the server obtains a corresponding original speech signal. After preprocessing the original speech signal such as framing and windowing, the server extracts an amplitude spectrum feature and a phase spectrum feature of a current frame. The server further performs band division on the amplitude spectrum feature of the current frame to extract corresponding subband amplitude spectrums, and performs reverberation strength prediction on the subband-based subband amplitude spectrums by using a first reverberation predictor. In this way, a reverberation strength indicator of the current frame may be accurately predicted. Then, a clean speech subband spectrum of the current frame is further predicted with reference to the obtained reverberation strength indicator and the subband amplitude spectrums of the current frame by using a second reverberation predictor. The server performs signal conversion on the clean speech subband spectrum and the phase spectrum feature, to obtain a dereverberated clean speech signal. The server then sends the dereverberated clean speech signal to a corresponding receiving-party user terminal in the current conference. A speaker device of the user terminal outputs the dereverberated clean speech signal. This may effectively obtain the highly dereverberated clean speech signal and effectively improve accuracy and efficiency of speech dereverberation.

Figure 5:
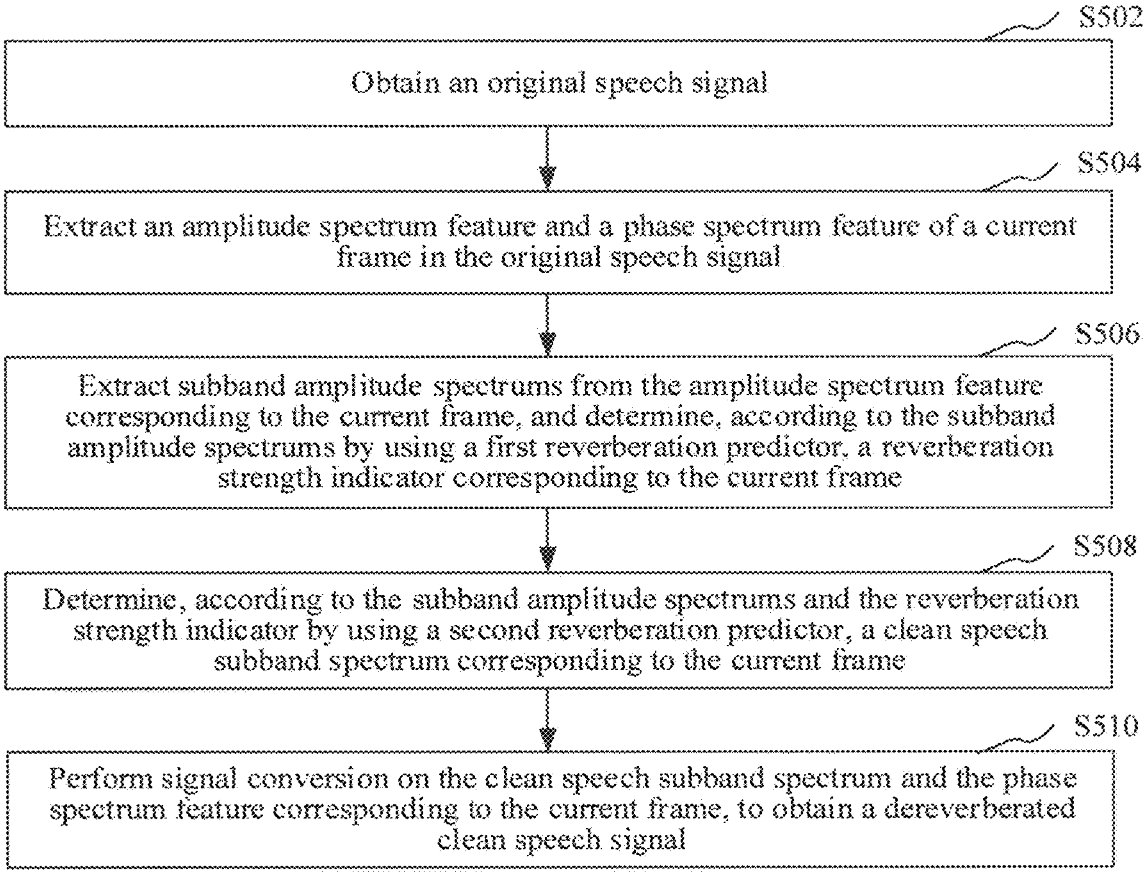
FIG. 5 is a flowchart of a speech signal dereverberation processing method according to an embodiment.

FIG. 5 is a flowchart of a speech signal dereverberation processing method according to an embodiment. As shown in FIG. 5, an embodiment provides a speech signal dereverberation processing method. In this embodiment, for example, the method is applied to a computer device. The computer device specifically may be the terminal 102 or the server 104 in the foregoing figure. Referring to FIG. 5, the speech signal dereverberation processing method includes the following operations:

In operation S502, the system obtains an original speech signal.

In operation S504, the system extracts an amplitude spectrum feature and a phase spectrum feature of a current frame in the original speech signal.

Generally, when an audio signal is captured or recorded, in addition to a required sound wave that is emitted by a sound source and directly arrives, a microphone further receives a sound source that is emitted by the sound source and arrives through other paths, and a sound wave (that is, background noise) that is produced by other sound sources in the environment and is not required. In acoustics, a reflected wave that delays by about more than 50 milliseconds (ms) is referred to as echo, and the effect of remaining reflected waves is referred to as reverberation.

The audio capturing apparatus may capture, through an audio channel, an original speech signal emitted by a user, where the original speech signal may be a reverberated audio signal. Generally, because a speaker is far away from a microphone or an indoor acoustic environment is poor, reverberation is caused. As a result, a speech is unclear and speech communication quality is affected. Therefore, dereverberation processing needs to be performed on the reverberated original speech signal. The speech signal dereverberation processing method in this embodiment may be applied to process a single channel of original speech signal.

After obtaining the original speech signal, the computer device first preprocesses the original speech signal, where preprocessing includes pre-emphasis, framing, windowing, and other processing. Specifically, framing and windowing processing is performed on the captured original speech signal, to obtain the preprocessed original speech signal, and then each frame of the original speech signal is processed. For example, the original speech signal is divided into multiple frames with a frame length of 10 to 30 ms by using a triangular window or a Hanning window, and a frame shift may be 10 ms, such that the original speech signal may be divided into multiple frames of speech signals, that is, speech signals corresponding to multiple speech frames.

Fourier transform may implement time-to-frequency conversion. In Fourier analysis, a change of an amplitude value of each component along with frequency is referred to as an amplitude spectrum of the signal; and a change of a phase value of each component along with frequency is referred to as a phase spectrum of the signal. The amplitude spectrum and the phase spectrum are obtained after Fourier transform is performed on the original speech signal.

After performing windowing and framing on the original speech signal, the computer device may obtain multiple speech frames. Then, the computer device performs fast Fourier conversion on the original speech signal on which windowing and framing are performed, to obtain the spectrum of the original speech signal. The computer device may extract, according to the spectrum of the original speech signal, an amplitude spectrum feature and a phase spectrum feature corresponding to a current frame. It may be understood that the current frame may be one of speech frames being processed the computer device.

In operation S506, the system extracts subband amplitude spectrums from the amplitude spectrum feature corresponding to the current frame, and determine, according to the subband amplitude spectrums by using a first reverberation predictor, a reverberation strength indicator corresponding to the current frame.

Subband amplitude spectrums are multiple subband amplitude spectrums obtained by performing subband division on an amplitude spectrum of each speech frame, where multiple subband amplitude spectrums are at least two subband amplitude spectrums or more. Specifically, the computer device may perform band division on the amplitude spectrum feature to divide an amplitude spectrum of each speech frame into multiple subband amplitude spectrums, to obtain subband amplitude spectrums corresponding to the amplitude spectrum feature of the current frame. Corresponding subband amplitude spectrums are calculated for each frame.

The first reverberation predictor may be a machine learning model. A machine learning model is a model that has a specific capability after learning through samples, and specifically may be a neural network model, such as a convolutional neural network (CNN) model, a recurrent neural network (RNN) module, and a long short-term memory (LSTM) module. Specifically, the first reverberation predictor may be a reverberation strength predictor based on an LSTM neural network model. The first reverberation predictor is a pre-trained neural network model with a reverberation prediction capability.

Specifically, the computer device performs band division on the amplitude spectrum feature of the current frame, to obtain multiple subband amplitude spectrums. That is, the amplitude spectrum feature of each frame is divided into multiple subband amplitude spectrums, where each subband amplitude spectrum includes a corresponding subband identifier.

The computer device further inputs the subband amplitude spectrums corresponding to the amplitude spectrum feature of the current frame to the first reverberation predictor. Specifically, the first reverberation predictor includes multiple layers of neural networks. The computer device uses an amplitude spectrum feature of each subband amplitude spectrum as an input feature of a network model, analyzes the amplitude spectrum feature of each subband amplitude spectrum according to a corresponding network parameter and network weight by using multiple layers of network structures in the first reverberation strength predictor, to predict a clean speech energy ratio of each subband in the current frame, and then outputs, according to the clean speech energy ratio of each subband, the reverberation strength indicator corresponding to the current frame.

In operation S508, the system determines, according to the subband amplitude spectrums and the reverberation strength indicator by using a second reverberation predictor, a clean speech subband spectrum corresponding to the current frame.

The second reverberation predictor may be a reverberation strength prediction algorithm model based on a history frame. For example, the reverberation strength prediction algorithm may be a weighted recursive least square algorithm, an autoregressive prediction model, a speech signal linear prediction algorithm, or the like. This is not limited herein.

The computer device further extracts a steady noise spectrum and a steady reverberation amplitude spectrum of each subband in the current frame by using the second reverberation predictor, calculates the posterior signal-to-interference ratio based on the steady noise spectrum and the steady reverberation amplitude spectrum of each subband and the subband amplitude spectrum, calculates the prior signal-to-interference ratio based on the posterior signal-to-interference ratio and the reverberation strength indicator outputted by the first reverberation predictor, and performs weighting processing on the subband amplitude spectrums based on the prior signal-to-interference ratio. In this way, the estimated clean speech subband amplitude spectrum may be accurately and effectively obtained.

In operation S510, the system performs signal conversion on the clean speech subband spectrum and the phase spectrum feature corresponding to the current frame, to obtain a dereverberated clean speech signal.

After predicting the reverberation strength indicator corresponding to the current frame by using the first reverberation predictor, the computer device determines the clean speech subband spectrum of the current frame according to the subband amplitude spectrums and the reverberation strength indicator by using the second reverberation predictor. In this way, the dereverberated clean speech subband amplitude spectrum may be accurately and effectively estimated.

The computer device then performs inverse constant transform on the clean speech subband spectrum, to obtain the transformed clean speech amplitude spectrum, and combines and performs time domain transform on the clean speech amplitude spectrum and the phase spectrum feature, to obtain the dereverberated clean speech signal. The first reverberation predictor based on a neural network and the second reverberation predictor based on a history frame are combined for reverberation estimation, such that accuracy of reverberation strength estimation may be improved. This may effectively improve accuracy of dereverberation of the speech signal and effectively improve accuracy of speech recognition.

In the foregoing speech signal dereverberation processing method, an original speech signal is obtained, and after an amplitude spectrum feature and a phase spectrum feature of a current frame in the original speech signal are extracted, band division is performed on the amplitude spectrum feature of the current frame, to extract corresponding subband amplitude spectrums. Reverberation strength prediction is performed on the subband-based subband amplitude spectrum by using a first reverberation predictor, such that a reverberation strength indicator of the current frame may be accurately predicted. Then, a clean speech subband spectrum of the current frame is further predicted with reference to the obtained reverberation strength indicator and subband amplitude spectrums by using a second reverberation predictor, such that a clean speech amplitude spectrum of each speech frame may be precisely extracted. Therefore, the dereverberated clean speech signal may be accurately and effectively obtained according to the extracted clean speech amplitude spectrum, and the accuracy of dereverberation of the speech signal may be effectively improved.

In the conventional speech signal dereverberation processing method, a conventional reverberation predictor estimates a power spectrum of later reverberation based on linear superimposition of power spectrums of history frames, and then subtracts the power spectrum of the later reverberation from the current frame, to obtain a dereverberated power spectrum to obtain the dereverberated time domain speech signal. This method relies on assumption of statistical stationarity or short-term stationarity of a speech reverberation component, and earlier reverberation including early reflected sound cannot be accurately estimated. In the conventional method of directly predicting an amplitude spectrum based on a neural network, the amplitude spectrum changes within a large range, and learning is also very difficult, resulting in more damage of the speech. Besides, a complex network structure is usually required to process multiple frequency features and the calculation amount is large, resulting in low processing efficiency.

Figure 6:
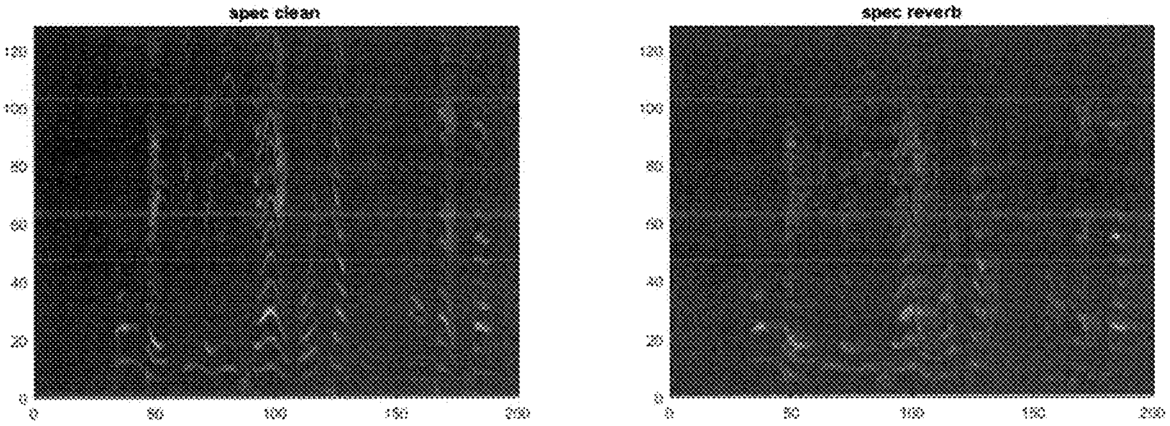
FIG. 6 is a spectrogram of a clean speech and a reverberated speech according to an embodiment.

FIG. 6 is a spectrogram of a clean speech and a reverberated speech according to an embodiment. In this embodiment, a section of clean speech signal and a section of reverberated speech signal recorded in a reverberation environment are used for experimental test. The reverberated speech signal recorded in a reverberation environment is processed by using the speech signal dereverberation processing method in this embodiment. The experimental test includes: the speech spectrum of the clean speech, a spectrogram of the reverberated speech recorded in the reverberation environment, and a reverberation strength distribution graph are compared. (a) of FIG. 6 is the speech spectrum of the clean speech, where the horizontal axis is the time axis, and the vertical axis is the frequency axis. (b) of FIG. 6 is a spectrogram of the reverberated speech obtained by recording a clean speech in a reverberation environment. By comparing (a) of FIG. 6 with (b) of FIG. 6, it may be seen that the speech spectral line in (b) of FIG. 6 is fuzzy and distorted.

Figure 7:
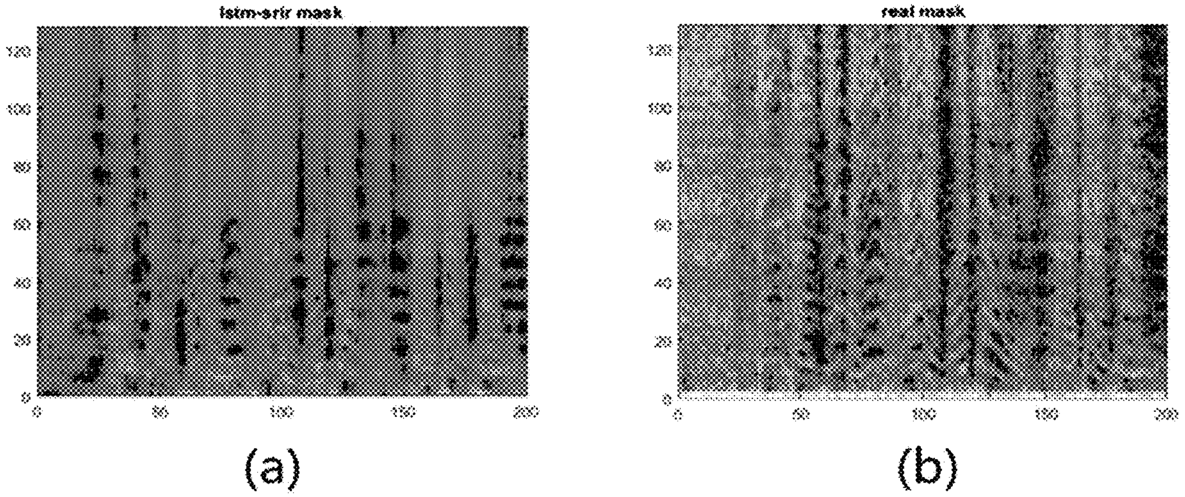
FIG. 7 is a diagram illustrating a reverberation strength distribution diagram and a predicted reverberation strength distribution diagram of a speech signal according to an embodiment.

FIG. 7 is a diagram illustrating a reverberation strength distribution diagram and a predicted reverberation strength distribution diagram of a speech signal according to an embodiment. (a) of FIG. 7 shows different band distortions at different specific moments, that is, the strength of reverberation interference, where a brighter color indicates stronger reverberation. (a) of FIG. 7 shows reverberation strength of a reverberated speech, which is also the target predicted by the first reverberation predictor in this embodiment.

The first reverberation predictor based on a neural network predicts the reverberation strength of the reverberated speech, and an obtained prediction result may be shown in (b) of FIG. 7. It may be seen from (b) of FIG. 7 that real reverberation strength distribution in (a) of FIG. 7 is predicted accurately by the first reverberation predictor.

Figure 8:
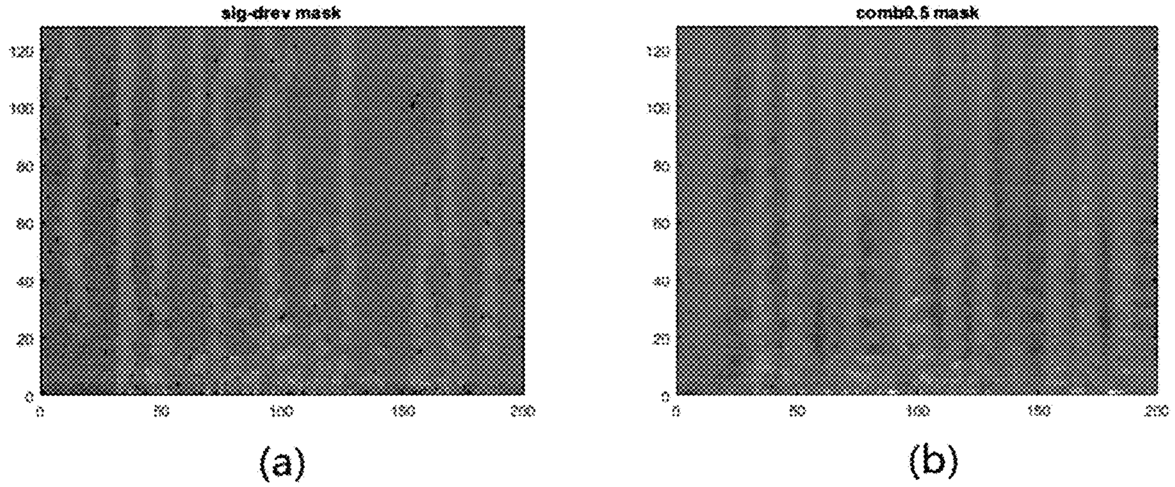
FIG. 8 is a diagram illustrating a predicted reverberation strength distribution diagram based on a traditional manner and a predicted reverberation strength distribution diagram based on a speech signal dereverberation processing method according to an embodiment of the disclosure.

FIG. 8 is a diagram illustrating a predicted reverberation strength distribution diagram based on a traditional manner and a predicted reverberation strength distribution diagram based on a speech signal dereverberation processing method according to an embodiment of the disclosure. In contrast, when the first reverberation predictor based on a neural network in this solution is not used and only a conventional reverberation predictor based on a history frame is used for prediction, an obtained result is shown in (a) of FIG. 8. It may be seen from (a) of FIG. 8 that details of the reverberation strength distribution cannot be accurately estimated.

Further, the result predicted by the first reverberation predictor based on a neural network is combined with the second reverberation predictor based on a history frame to predict reverberation strength, to obtain a result shown in (b) of FIG. 8. Compared with the conventional method, the result obtained in the solution of this embodiment is closer to the true reverberation strength distribution, and the reverberation prediction accuracy of the reverberated speech signal is significantly improved.

Figure 9:
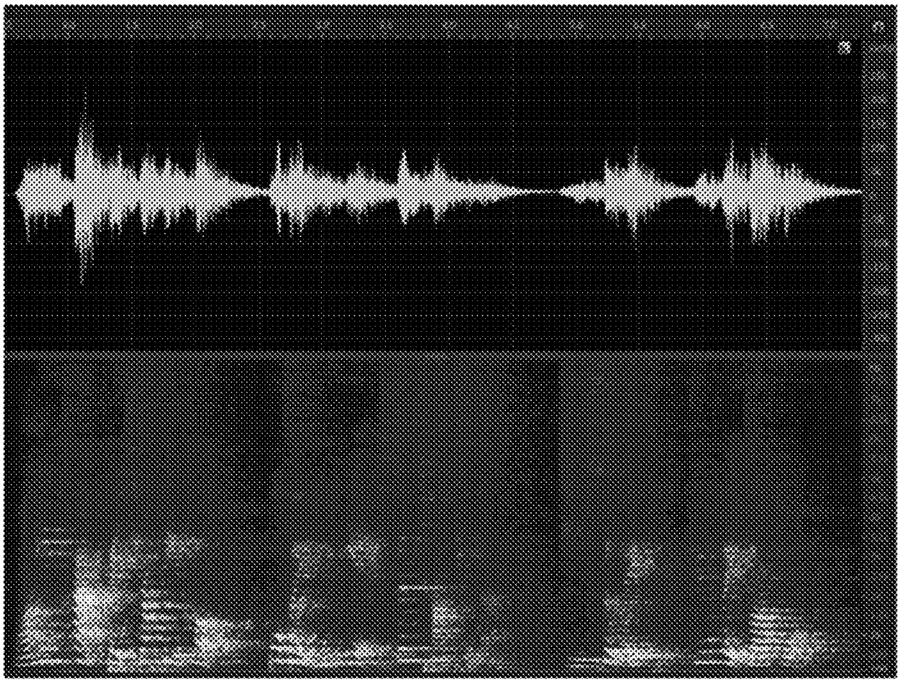
FIG. 9 is a speech time-domain waveform spectrogram corresponding to a reverberated original speech signal according to an embodiment.

FIG. 9 is a speech time-domain waveform spectrogram corresponding to a reverberated original speech signal according to an embodiment. As shown in FIG. 9, it may be seen that due to the presence of reverberation, the speech has a long tail, waveforms of words are connected, spectral lines of the spectrogram are blurred, and the overall intelligibility and clarity of the speech signal are low.

Figure 10:
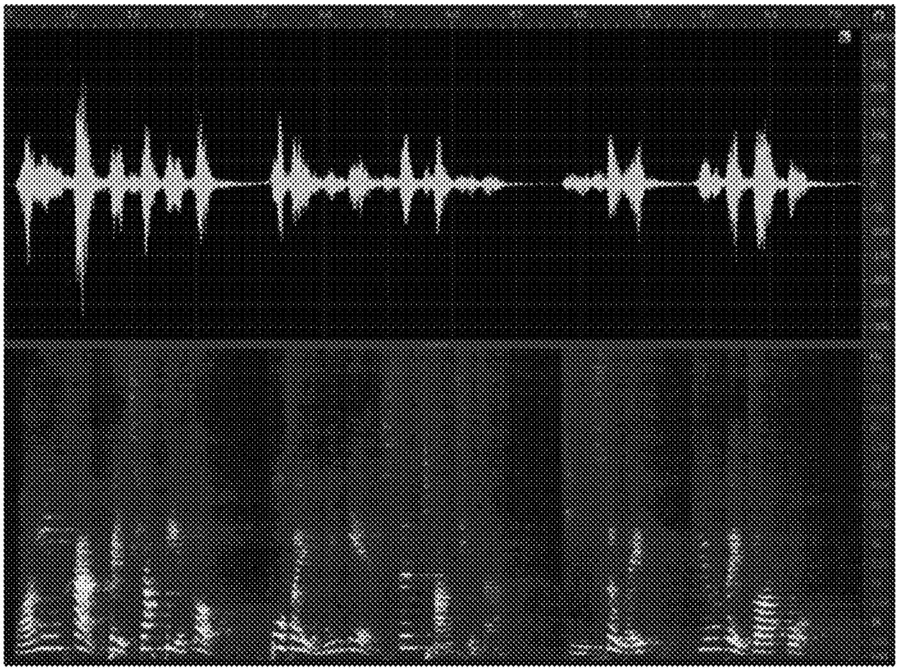
FIG. 10 is a speech time-domain waveform spectrogram corresponding to a clean speech signal according to an embodiment.

FIG. 10 is a speech time-domain waveform spectrogram corresponding to a clean speech signal according to an embodiment. The reverberated original speech signal is processed by using the speech signal dereverberation processing method of this embodiment, to obtain the speech time-domain waveform spectrogram corresponding to the clean speech signal shown in FIG. 10. Reverberation strength prediction is performed on the subband-based subband amplitude spectrum of the current frame by using a first reverberation predictor, such that a reverberation strength indicator of the current frame is obtained. Then, a clean speech subband spectrum of the current frame is further predicted with reference to the obtained reverberation strength indicator and the subband amplitude spectrums by using a second reverberation predictor, such that the clean speech signal may be accurately extracted, thereby effectively improving the accuracy of dereverberation of the speech signal.

In an embodiment, the determining, according to the subband amplitude spectrums by using a first reverberation predictor, a reverberation strength indicator corresponding to the current frame includes: predicting, by using the first reverberation predictor, a clean speech energy ratio corresponding to the subband amplitude spectrum; and determining, according to the clean speech energy ratio, the reverberation strength indicator corresponding to the current frame.

The first reverberation predictor is a reverberation predictor based on a neural network model obtained by pretraining a large amount of reverberated speech data and clean speech data. The first reverberation predictor includes multiple layers of network structures, and each layer of network includes a corresponding network parameter and network weight to predict the clean speech ratio of each subband in the reverberated original speech signal.

After extracting the subband amplitude spectrums corresponding to the amplitude spectrum of the current frame, the computer device inputs the subband amplitude spectrums of the current frame to the first reverberation predictor. Each layer of network of the first reverberation predictor analyzes each subband amplitude spectrum. The first reverberation predictor compares a ratio of energy of the reverberated original speech and energy of the clean speech in each subband amplitude spectrum as a prediction target. The clean speech energy ratio of each subband amplitude spectrum may be analyzed based on the network parameter and the network weight of each network layer of the first reverberation predictor. Further, reverberation strength distribution of the current frame may be predicted based on the clean speech energy ratio of each subband amplitude spectrum of the current frame, to obtain the reverberation strength indicator corresponding to the current frame. Reverberation of each subband amplitude spectrum is predicted by using the pre-trained first reverberation predictor based on a neural network, such that a reverberation strength indicator of the current frame may be accurately estimated.

FIG. 11 is a flowchart of a speech signal dereverberation processing method according to an embodiment. In an embodiment, as shown in FIG. 11, a speech signal dereverberation processing method is provided, including the following operations:

In operation S1102, the system obtains an original speech signal; and extract an amplitude spectrum feature and a phase spectrum feature of a current frame in the original speech signal.

In operation S1104, the system extracts subband amplitude spectrums from the amplitude spectrum feature corresponding to the current frame, and extract a dimension feature of the subband amplitude spectrums by using an input layer of a first reverberation predictor.

In operation S1106, the system extracts representation information of the subband amplitude spectrums according to the dimension feature by using a prediction layer of the first reverberation predictor, and determine a clean speech energy ratio of the subband amplitude spectrums according to the representation information.

In operation S1108, the system outputs, by using an output layer of the first reverberation predictor and according to the clean speech energy ratio corresponding to the subband amplitude spectrum, a reverberation strength indicator corresponding to the current frame.

In operation S1110, the system determines, according to the subband amplitude spectrums and the reverberation strength indicator by using a second reverberation predictor, a clean speech subband spectrum corresponding to the current frame.

In operation S1112, the system performs signal conversion on the clean speech subband spectrum and the phase spectrum feature corresponding to the current frame, to obtain a dereverberated clean speech signal.

The first reverberation predictor is a neural network model based on an LSTM long short-term memory network, and the first reverberation predictor includes an input layer, a prediction layer, and an output layer. The input layer and the output layer may be fully connected layers, the input layer is configured to extract a feature dimension of input data of the model, and the output layer is configured to regularize an average value and a value range and output a result. Specifically, the prediction layer may be a network layer of an LSTM structure, where the prediction layer at least includes a network layer of two layers of LSTM structures. The network structure of the prediction layer includes an input gate, an output gate, a forget gate, and a cell state unit, such that an LSTM has a significantly improved timing modeling capability and may memorize more information and effectively grasp long-term dependence in data, to accurately and effectively extract representation information of the input feature.

In a process of predicting the reverberation strength indicator of the current frame by using the first reverberation predictor, after inputting each subband amplitude spectrum of the current frame to the first reverberation predictor, the computer device first extracts the dimension feature of each subband amplitude spectrum by using the input layer of the first reverberation strength predictor. Specifically, the computer device may use a subband amplitude spectrum extracted in a constant-Q band as a network input feature. For example, the number of Q bands may be represented by K, which is also an input feature dimension of the first reverberation predictor. For example, when a sampling rate of an input speech is 16 kHz and a frame length is 20 ms, after 512-point short time Fourier transform (STFT), the value of K is 8. After the first reverberation predictor performs prediction analysis on the input feature, an output is also an 8-dimensional feature, that is, represents reverberation strength predicted in 8 constant-Q bands.

In an embodiment, a network layer of a node 1024 may be used as each layer of network structure of the first reverberation predictor. The prediction layer is an LSTM network of two layers of nodes 1024. FIG. 7 is a schematic diagram of a network layer structure corresponding to the first reverberation predictor using an LSTM network of two layers of nodes 1024.

The prediction layer is a network layer based on an LSTM, and an LSTM network includes three gates: a forget gate, an input gate, and an output gate. The forget gate determines how much of information in a previous state needs to be discarded. For example, a value between 0 and 1 may be outputted to represent reserved information. A value outputted by a hidden layer at a previous moment may be used as a parameter of the forget gate. The input gate is configured to determine which information needs to be reserved in the cell state unit, and a parameter of the input gate may be obtained through training. The forget gate calculates how much information in an old cell state unit is abandoned, and then the input gate adds an obtained result to a cell state to indicate how much of newly inputted information is added to the cell state. After the cell state unit is updated, an output is calculated based on a cell state. Data is inputted to a sigmoid activation function to obtain a value of the "output gate". Then, after information of the cell state unit is processed, the processed information is combined with the value of the output gate to obtain the output result of the cell state unit through processing.

After extracting the dimension feature of each subband amplitude spectrum by using the input layer of the first reverberation strength predictor, the computer device extracts the representation information of each subband amplitude spectrum according to the dimension feature by using the prediction layer of the first reverberation predictor. Each network layer structure of the prediction layer extracts the representation information of each subband amplitude spectrum based on a corresponding network parameter and network weight. The representation information may further include representation information of multiple levels. For example, each network layer extracts the representation information of a corresponding subband amplitude spectrum. After extraction by multiple network layers, in-depth representation information of each subband amplitude spectrum may be extracted to further accurately perform prediction analysis based on the extracted representation information.

The computer device outputs the clean speech energy ratio of each subband amplitude spectrum according to the representation information by using the prediction layer, and outputs, by using the output layer according to the clean speech energy ratio corresponding to each subband, the reverberation strength indicator corresponding to the current frame. The computer device determines, according to the subband amplitude spectrums and the reverberation strength indicator by using a second reverberation predictor, a clean speech subband spectrum of the current frame. Signal conversion is performed on the clean speech subband spectrum and the phase spectrum feature, to obtain a dereverberated clean speech signal.

In this embodiment, each subband amplitude spectrum is analyzed based on the network parameter and the network weight of each network layer of the pre-trained first reverberation predictor based on a neural network, and the clean speech energy ratio of each subband amplitude spectrum may be precisely analyzed, to accurately and effectively estimate the reverberation strength indicator of each speech frame.

In an embodiment, the determining, according to the subband amplitude spectrums and the reverberation strength indicator by using a second reverberation predictor, a clean speech subband spectrum corresponding to the current frame includes: determining a posterior signal-to-interference ratio of the current frame according to the amplitude spectrum feature of the current frame by using the second reverberation predictor; determining a prior signal-to-interference ratio of the current frame according to the posterior signal-to-interference ratio and the reverberation strength indicator; and performing filtering enhancement processing on the subband amplitude spectrums of the current frame based on the prior signal-to-interference ratio, to obtain a clean speech subband amplitude spectrum corresponding to each speech frame.

A signal-to-interference ratio is a ratio of signal energy to the sum of interference energy (such as frequency interference and multipath) and additive noise energy. The prior signal-to-interference ratio is a signal-to-interference ratio obtained according to previous experience and analysis, and the posterior signal-to-interference ratio is an estimated signal-to-interference ratio closer to reality obtained after modifying original prior information based on new information.

When predicting the reverberation of the subband amplitude spectrum, the computer device further estimates stationary noise of each subband amplitude spectrum by using the second reverberation predictor, and calculates the posterior signal-to-interference ratio of the current frame according to an estimation result. The second reverberation predictor calculates the prior signal-to-interference ratio of the current frame according to the posterior signal-to-interference ratio of the current frame and the reverberation strength indicator predicted by the first reverberation predictor. After the second reverberation predictor obtains the prior signal-to-interference ratio of the current frame, weighting enhancement processing is performed on the subband amplitude spectrums of the current frame based on the prior signal-to-interference ratio, to obtain a predicted clean speech subband spectrum of the current frame. The first reverberation predictor may precisely predict the reverberation strength indicator of the current frame, and then dynamically adjust a dereverberation amount based on the reverberation strength indicator, to accurately calculate the prior signal-to-interference ratio of the current frame and precisely estimate the clean speech subband spectrum.

Figure 12:
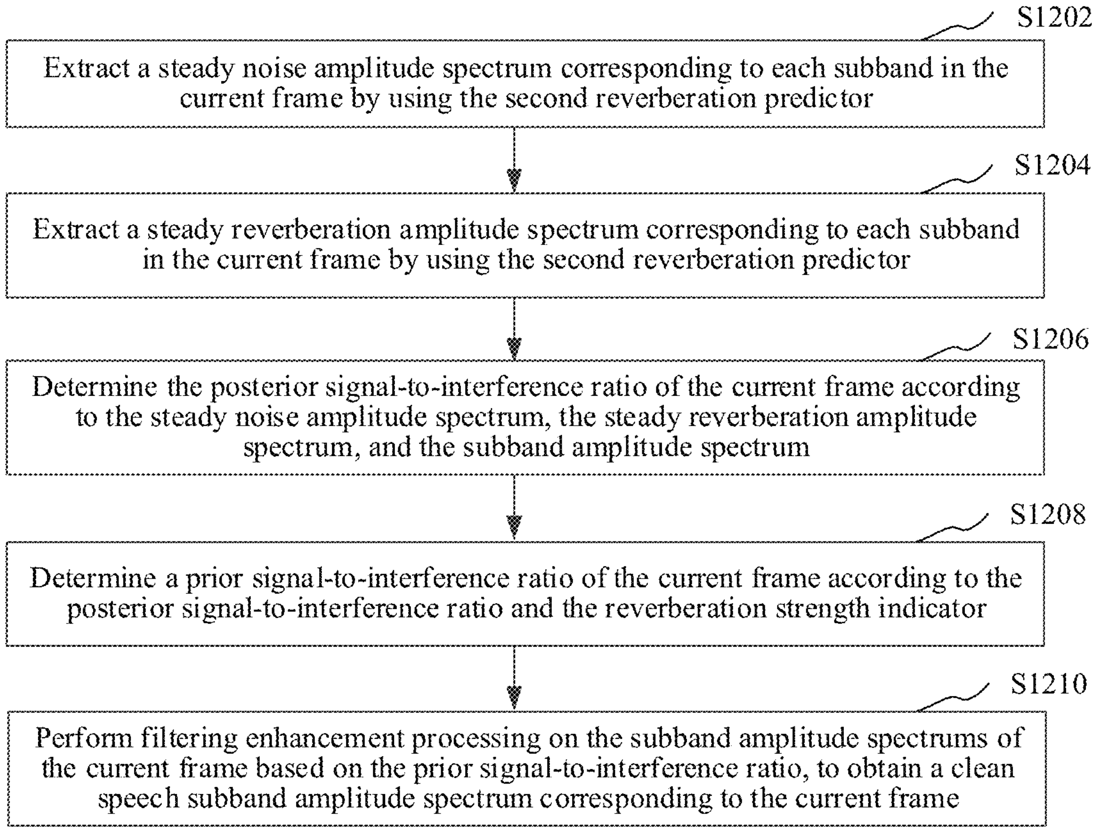
FIG. 12 is a flowchart of a step of determining, according to the subband amplitude spectrums and the reverberation strength indicator by using a second reverberation predictor, a clean speech subband spectrum of the current frame according to an embodiment.

FIG. 12 is a flowchart of a step of determining, according to the subband amplitude spectrums and the reverberation strength indicator by using a second reverberation predictor, a clean speech subband spectrum of the current frame according to an embodiment. In an embodiment, as shown in FIG. 12, the operation of determining, according to the subband amplitude spectrums and the reverberation strength indicator by using a second reverberation predictor, a clean speech subband spectrum corresponding to the current frame specifically includes the following:

In operation S1202, the system extracts a steady noise amplitude spectrum corresponding to each subband in the current frame by using the second reverberation predictor.

In operation S1204, the system extracts a steady reverberation amplitude spectrum corresponding to each subband in the current frame by using the second reverberation predictor.

In operation S1206, the system determines the posterior signal-to-interference ratio of the current frame according to the steady noise amplitude spectrum, the steady reverberation amplitude spectrum, and the subband amplitude spectrum.

In operation S1208, the system determines a prior signal-to-interference ratio of the current frame according to the posterior signal-to-interference ratio and the reverberation strength indicator.

In operation S1210, the system performs filtering enhancement processing on the subband amplitude spectrums of the current frame based on the prior signal-to-interference ratio, to obtain a clean speech subband amplitude spectrum corresponding to the current frame.

The steady noise is continuous noise whose noise strength fluctuates within 5 dB or pulse noise whose repetition frequency is greater than 10 Hz. The steady noise amplitude spectrum is an amplitude spectrum of subband noise amplitude distribution, and the steady reverberation amplitude spectrum is an amplitude spectrum of subband reverberation amplitude distribution.

When processing the subband amplitude spectrums of the current frame, the second reverberation predictor extracts the steady noise amplitude spectrum corresponding to each subband in the current frame, and extracts the steady reverberation amplitude spectrum corresponding to each subband in the current frame. The second reverberation predictor then calculates the posterior signal-to-interference ratio of the current frame based on the steady noise amplitude spectrum and the steady reverberation amplitude spectrum of each subband and the subband amplitude spectrum, and further calculates the prior signal-to-interference ratio of the current frame based on the posterior signal-to-interference ratio and the reverberation strength indicator. Filtering enhancement processing is performed on the subband amplitude spectrums of the current frame based on the prior signal-to-interference ratio, for example, weighting may be performed on the subband amplitude spectrums of the current frame based on the prior signal-to-interference ratio, to obtain a clean speech subband amplitude spectrum of the current frame.

The computer device performs band division on the amplitude spectrum feature of the current frame, extracts the subband amplitude spectrums corresponding to the current frame, and then predicts, by using the first reverberation predictor, the reverberation strength indicator corresponding to the current frame. At the same time, the second reverberation predictor may also analyze the subband amplitude spectrums of the current frame. The processing order of the first reverberation predictor and the second reverberation predictor is not limited herein. After the first reverberation predictor outputs the reverberation strength indicator of the current frame and the second reverberation predictor calculates the posterior signal-to-interference ratio of the current frame, the second reverberation predictor further calculates the prior signal-to-interference ratio of the current frame according to the posterior signal-to-interference ratio and the reverberation strength indicator; and performs filtering enhancement processing on the subband amplitude spectrums of the current frame based on the prior signal-to-interference ratio, to precisely estimate the clean speech subband amplitude spectrum of the current frame.

In an embodiment, the method further includes obtaining a clean speech amplitude spectrum of a previous frame; and determining the posterior signal-to-interference ratio of the current frame based on the clean speech amplitude spectrum of the previous frame and according to the steady noise amplitude spectrum, the steady reverberation amplitude spectrum, and the subband amplitude spectrum.

The second reverberation predictor is a reverberation strength prediction algorithm model based on history frame analysis. For example, if the current frame is a $p^{th}$ frame, the history frame may be a $(p-1)^{th}$ frame, a $(p-2)^{th}$ frame, or the like.

Specifically, the history frame in this embodiment is a previous frame of the current frame, and the current frame is a frame that needs to be processed by the computer device. After processing a previous frame of speech signal corresponding to the current frame of the original speech signal, the computer device may directly obtain a clean speech amplitude spectrum of the previous frame. After further processing the speech signal of the current frame and obtaining the reverberation strength indicator of the current frame by using the first reverberation predictor, when predicting the clean speech subband spectrum of the current frame by using the second reverberation predictor, the computer device extracts the steady noise amplitude spectrum and the steady reverberation amplitude spectrum corresponding to each subband in the current frame, and then calculates the posterior signal-to-interference ratio of the current frame based on the clean speech amplitude spectrum of the previous frame, and the steady noise amplitude spectrum, the steady reverberation amplitude spectrum, and the subband amplitude spectrums of the current frame. The second reverberation predictor analyzes the posterior signal-to-interference ratio of the current frame based on the history frame and the reverberation strength indicator of the current frame predicted by the first reverberation predictor. Therefore, the highly accurate posterior signal-to-interference ratio may be calculated, such that the clean speech subband amplitude spectrum of the current frame may be precisely estimated based on the obtained posterior signal-to-interference ratio.

In an embodiment, the method further includes performing framing and windowing processing on the original speech signal, to obtain the amplitude spectrum feature and the phase spectrum feature corresponding to the current frame in the original speech signal; and obtaining a preset band coefficient, and performing band division on the amplitude spectrum feature of the current frame according to the band coefficient, to obtain the subband amplitude spectrums corresponding to the current frame.

The band coefficient is used to divide each frame into a corresponding number of subbands according to a value of the band coefficient, and the band coefficient may be a constant coefficient. For example, band division may be performed on the amplitude spectrum feature of the current frame in a constant-Q (a constant value Q and Q is a constant) band division manner. A ratio of a center frequency to a bandwidth is the constant Q, and the constant value Q is the band coefficient.

Specifically, after obtaining the original speech signal, the computer device performs windowing and framing on the original speech signal, and performs fast Fourier conversion on the original speech signal on which windowing and framing are performed, to obtain the spectrum of the original speech signal. The computer device then processes a spectrum of each frame of original speech signal at a time.

The computer device first extracts an amplitude spectrum feature and a phase spectrum feature of a current frame according to the spectrum of the original speech signal. Then, the computer device performs constant-Q band division on the amplitude spectrum feature of the current frame, to obtain the corresponding subband amplitude spectrum. A subband corresponds to a segment of subband and a segment of subband may include a series of frequencies, for example, a subband 1 corresponds to 0 Hz to 100 Hz and a subband 2 corresponds to 100 Hz to 300 Hz. An amplitude spectrum feature of a subband is obtained through weighted summation of frequencies included in the subband. Band division is performed on the amplitude spectrum of each frame, such that the feature dimension of the amplitude spectrum may be effectively reduced. For example, the constant-Q division conforms to the physiological auditory characteristic that human ears may distinguish low-band sound better than high-band sound. This may effectively improve the precision of the analysis of the amplitude spectrum, such that reverberation prediction analysis may be more precisely performed on the speech signal.

In an embodiment, the performing signal conversion on the clean speech subband spectrum and the phase spectrum feature corresponding to the current frame, to obtain a dereverberated clean speech signal includes performing inverse constant transform on the clean speech subband spectrum according to a band coefficient, to obtain a clean speech amplitude spectrum corresponding to the current frame; and performing time-to-frequency conversion on the clean speech amplitude spectrum and the phase spectrum feature corresponding to the current frame, to obtain the dereverberated clean speech signal.

The computer device divides an amplitude spectrum of each frame into multiple subband amplitude spectrums, and performs reverberation prediction on each subband amplitude spectrum by using the first reverberation predictor, to obtain the reverberation strength indicator of the current frame. After calculating the clean speech subband spectrum of the current frame according to the subband amplitude spectrums and the reverberation strength indicator by using the second reverberation predictor, the computer device performs inverse constant transform on the clean speech subband spectrum. Specifically, the computer device may perform transform on the clean speech subband spectrum in the inverse constant-Q transform manner, to transform the constant-Q subband spectrum with uneven frequency distribution back to the STFT amplitude spectrum with balanced frequency distribution, to obtain the clean speech amplitude spectrum corresponding to the current frame. The computer device further combines and performs inverse Fourier transform on the obtained clean speech amplitude spectrum and the phase spectrum corresponding to the current frame of the original speech signal, to implement time-to-frequency conversion of the speech signal and obtain the converted clean speech signal, that is, the dereverberated clean speech signal. In this way, the clean speech signal may be accurately extracted, and the accuracy of dereverberation of the speech signal may be effectively improved.

In an embodiment, the first reverberation predictor is trained through the following steps: obtaining reverberated speech data and clean speech data, and generating training sample data by using the reverberated speech data and the clean speech data; determining a reverberation-to-clean-speech energy ratio as a training target; extracting a reverberated band amplitude spectrum corresponding to the reverberated speech data, and extracting a clean speech band amplitude spectrum of the clean speech data; and training the first reverberation predictor by using the reverberated band amplitude spectrum, the clean speech band amplitude spectrum, and the training target.

Before processing the original speech signal, the computer device further needs to pre-train the first reverberation predictor, where the first reverberation predictor is a neural network model. The clean speech data is a clean speech without reverberation noise, and reverberated speech data is a speech with reverberation noise, for example, may be speech data recorded in a reverberation environment.

Specifically, the computer device obtains reverberated speech data and clean speech data, and generates training sample data by using the reverberated speech data and the clean speech data. The training sample data is used to train a preset neural network. The training sample data specifically may be a pair of reverberated speech data and clean speech data corresponding to the reverberated speech data. The computer device uses the reverberation-to-clean-speech energy ratio of reverberated speech data to clean speech data as a training label, that is, a training target of model training. The training label is used to perform processing such as adjust the parameter of each training result to further train and optimize the neural network model.

After obtaining the reverberated speech data and the clean speech data and generating the training sample data, the computer device inputs the training sample data to the preset neural network model, and performs feature extraction and reverberation strength prediction analysis on the reverberated speech data to obtain the corresponding reverberation-to-clean-speech energy ratio. Specifically, the computer device uses the reverberation-to-clean-speech energy ratio of the reverberated speech data to the clean speech data as a prediction target, and inputs the reverberated speech data to a preset function to train a neural network model.

In a process of training the prediction model, the preset neural network model is trained for multiple times iteratively based on the reverberated speech data and the training target, to obtain a corresponding training result for each time. The computer device adjusts a parameter of the preset neural network model based on the training target and the training result, and continues the iterative training, until the trained first reverberation predictor is obtained when a training condition is met. The reverberated speech data and the clean speech data are trained by using the neural network, such that the first reverberation predictor with higher reverberation prediction accuracy may be effectively obtained through training.

In an embodiment, the training the first reverberation predictor by using the reverberated band amplitude spectrum, the clean speech band amplitude spectrum, and the training target includes: inputting the reverberated band amplitude spectrum and the clean speech band amplitude spectrum to a preset network model, to obtain a training result; and adjusting a parameter of the preset neural network model based on a difference between the training result and the training target, and continuing the training, until a training condition is met, to obtain the required first reverberation predictor.

The training condition is a condition satisfying model training. The training condition may be that a preset number of iterations is satisfied, and may also be that classification performance of an image classifier after parameter adjustment satisfies a preset indicator.

Specifically, after training the preset neural network model each time based on the reverberated speech data, to obtain a corresponding training result, the computer device compares the training result with the training target, to obtain the difference between the training result and the training target. The computer device further adjusts the parameter of the preset neural network model to reduce the difference, and continues the training. If the training result of the neural network model after parameter adjustment does not satisfy the training condition, the computer device continues to adjust the parameter of the neural network model based on the training label and continues the training. The computer device ends the training when the training condition is satisfied, to obtain the required prediction model.

The difference between the training result and the training target may be measured by using a cost function, and a function such as a cross entropy loss function or a mean square error function may be selected as the cost function. The training may end when a value of the cost function is less than a preset value, to improve the prediction accuracy of reverberation of the reverberated speech data. For example, the preset neural network model is based on an LSTM model, and a minimum mean square error criterion is selected to update a network weight. After a loss parameter becomes stable, a parameter of each layer of the LSTM network is finally determined. The training target is constrained within the range [0, 1] by using the sigmoid activation function. In this way, for new reverberated speech data, the network may predict a clean speech ratio of each band in the speech.

In this embodiment, during training of the prediction model, the neural network model is guided and optimized through parameter adjustment based on the training label, such that the prediction precision of reverberation of the reverberated speech data may be effectively improved, thereby effectively improving the prediction accuracy of the first reverberation predictor and effectively improving the accuracy of dereverberation of the speech signal.

Figure 13:
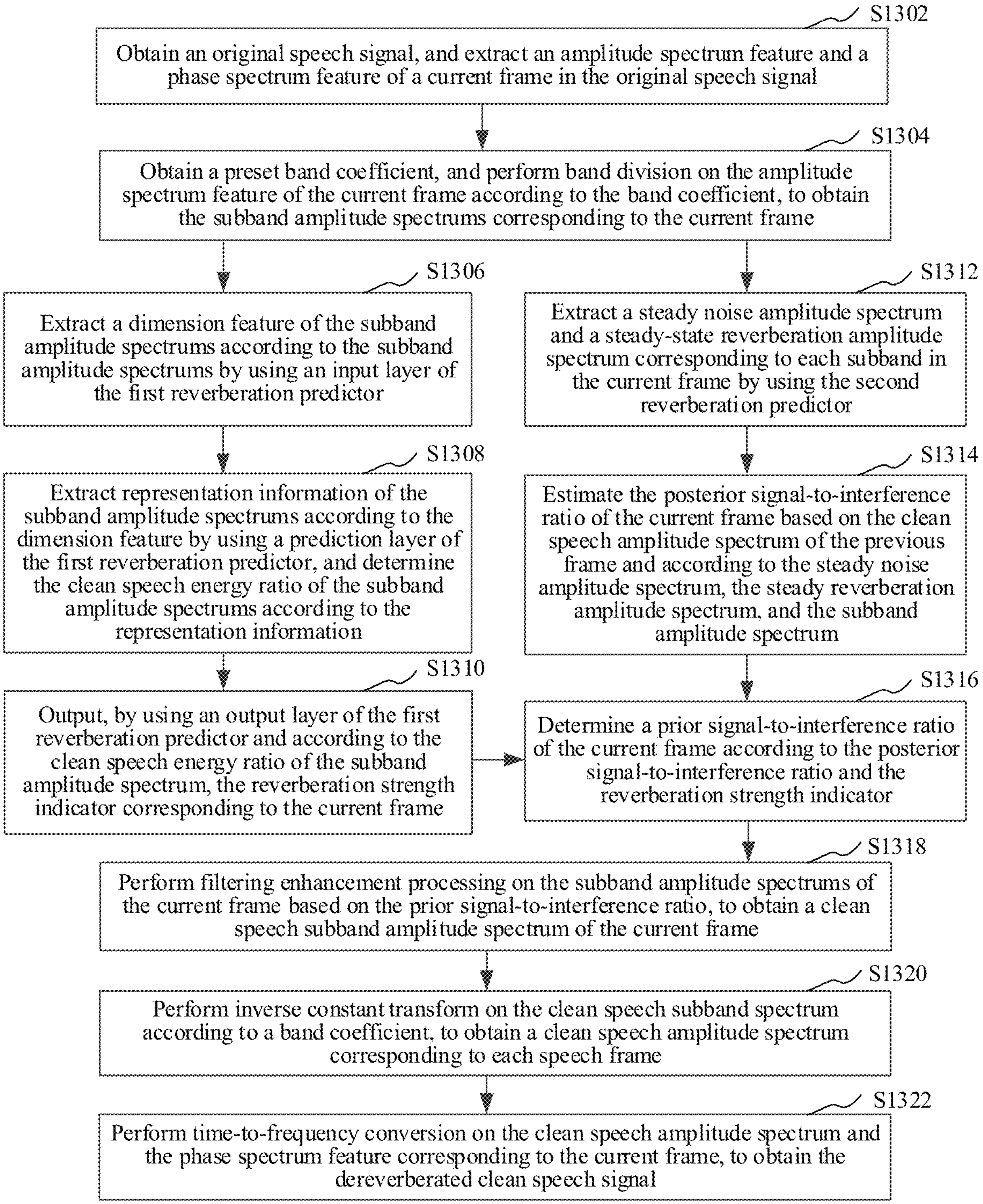
FIG. 13 is a flowchart of a speech signal dereverberation processing method according to an embodiment.

FIG. 13 is a flowchart of a speech signal dereverberation processing method according to an embodiment. As shown in FIG. 13, in a specific embodiment, the speech signal dereverberation processing method includes the following operations:

In operation S1302, the system obtains an original speech signal; and extract an amplitude spectrum feature and a phase spectrum feature of a current frame in the original speech signal.

In operation S1304, the system obtains a preset band coefficient, and perform band division on the amplitude spectrum feature of the current frame according to the band coefficient, to obtain the subband amplitude spectrums corresponding to the current frame.

In operation S1306, the system extracts a dimension feature of the subband amplitude spectrums based on the subband amplitude spectrums by using an input layer of a first reverberation predictor.

In operation S1308, the system extracts representation information of the subband amplitude spectrums according to the dimension feature by using a prediction layer of the first reverberation predictor, and determine a clean speech energy ratio of the subband amplitude spectrums according to the representation information.

In operation S1310, the system outputs, by using an output layer of the first reverberation predictor and according to the clean speech energy ratio of the subband amplitude spectrum, a reverberation strength indicator corresponding to the current frame.

In operation S1312, the system extracts a steady noise amplitude spectrum and a steady reverberation amplitude spectrum corresponding to each subband in the current frame by using the second reverberation predictor.

In operation S1314, the system determines the posterior signal-to-interference ratio of the current frame according to a clean speech amplitude spectrum of a previous frame, the steady noise amplitude spectrum, the steady reverberation amplitude spectrum, and the subband amplitude spectrum.

In operation S1316, the system determines a prior signal-to-interference ratio of the current frame according to the posterior signal-to-interference ratio and the reverberation strength indicator of the current frame.

In operation S1318, the system performs filtering enhancement processing on the subband amplitude spectrums of the current frame based on the prior signal-to-interference ratio, to obtain a clean speech subband amplitude spectrum of the current frame.

In operation S1320, the system performs inverse constant transform on the clean speech subband spectrum according to a band coefficient, to obtain a clean speech amplitude spectrum corresponding to the current frame.

In operation S1322, the system performs time-to-frequency conversion on the clean speech amplitude spectrum and the phase spectrum feature corresponding to the current frame, to obtain a dereverberated clean speech signal.

Specifically, the original speech signal may be expressed as x (n). The computer device performs preprocessing such as framing and windowing on the captured original speech signal, and then extracts an amplitude spectrum feature X (p, m) and a phase spectrum feature θ (p, m) corresponding to a current frame p, where m is a frequency identifier and p is an identifier of the current frame. The computer device further performs constant-Q band division on the amplitude spectrum feature X (p, m) of the current frame, to obtain a subband amplitude spectrum Y (p, q). A calculation formula may be as in Equation (1):

$$Y(p,q)=\sum_{i=2^q}^{2^{q+1}-1} w_q^* X(p,i). \tag{1}$$

q is a constant-Q band identifier, that is, a subband identifier; and $w_q$ is a weighting window of a $q^{th}$ subband. For example, a triangular window or a Hanning window may be used to perform windowing processing.

The computer device inputs the extracted subband amplitude spectrum Y (p, q) of the subband q of the current frame to the first reverberation strength predictor. The first reverberation strength predictor performs analysis processing on the subband amplitude spectrums Y (p, q) of the current frame, to obtain a reverberation strength indicator η (p, q) of the current frame.

The computer device further estimates a steady noise amplitude spectrum λ (p, q) included in each subband and a steady reverberation amplitude spectrum 1 (p, q) included in each subband by using the second reverberation strength predictor, and calculates a posterior signal-to-interference ratio γ (p, q) based on the steady noise amplitude spectrum λ (p, q), the steady reverberation amplitude spectrum (p, q), and the subband amplitude spectrums Y (p, q). A calculation formula may be as in Equation (2):

$$\gamma(p,q)=\frac{Y(p,q)}{\lambda(p,q)+l(p,q)}. \tag{2}$$

The computer device further calculates a prior signal-to-interference ratio ξ (p, q) based on the posterior signal-to-interference ratio γ (p, q) and the reverberation strength indicator η (p, q) outputted by the first reverberation strength predictor. A calculation formula may be as in Equations (3) and (4):

$$\xi(p,q)=(1-\eta(p,q))\frac{G(p-1)S(p-1,q)}{\lambda(p,q)+l(p,q)}+\eta(p,q)(\gamma(p,q)-1) \tag{3}$$

$$G(p,q)=\frac{\xi(p,q)}{\xi(p,q)+1}\exp\left(\int_{\frac{\xi(p,q)\gamma(p,q)}{\xi(p,q)+1}}^{\infty}\frac{\exp(-t)}{2t}dt\right). \tag{4}$$

η (p, q) is mainly used to dynamically adjust a dereverberation amount. A larger estimated η (p, q) indicates more serious reverberation of the subband q at a moment p and a larger dereverberation amount. On the contrary, a smaller estimated η (p, q) indicates less serious reverberation of the subband q at the moment p and a smaller dereverberation amount, and there is also less sound quality damage. G (p, q) is a prediction gain function, used to measure a clean speech energy ratio in a reverberated speech.

The computer device then performs weighting on the inputted subband amplitude spectrum Y (p, q) based on the prior signal-to-interference ratio ξ (p, q), to obtain the estimated clean speech subband amplitude spectrum S (p, q). The following inverse constant-Q transform is performed on the dereverberated clean speech subband amplitude spectrum S (p, q), as in Equation (5):

$$Z(p,m)=S(p,\lfloor \log 2q \rfloor) \tag{5}$$

Z (p, m) represents a clean speech amplitude spectrum feature. The computer device then performs inverse STFT based on the phase spectrum feature θ (p, m) of the current frame, to implement conversion from the frequency domain to the time domain and obtain a dereverberated time-domain speech signal S(n).

In this embodiment, reverberation strength prediction is performed on the subband-based subband amplitude spectrum by using a first reverberation predictor, such that a reverberation strength indicator of the current frame may be accurately predicted. Then, a clean speech subband spectrum of the current frame is further predicted with reference to the obtained reverberation strength indicator and the subband amplitude spectrums of the current frame by using a second reverberation predictor, such that a clean speech amplitude spectrum of the current frame may be accurately extracted, to effectively improve the accuracy of dereverberation of the speech signal.

It is to be understood that, although the operations in the flowcharts of FIG. 5, FIG. 11, FIG. 12, and FIG. 13 are sequentially displayed according to indication of arrows, the operations are not necessarily sequentially performed in the sequence indicated by the arrows. Unless clearly specified in this specification, there is no strict sequence limitation on the execution of the operations, and the operations may be performed in another sequence. In addition, at least some operations in FIG. 5, FIG. 11, FIG. 12, and FIG. 13 may include a plurality of operations or a plurality of stages. The operations or the stages are not necessarily performed at the same moment, but may be performed at different moments.

The operations or the stages are not necessarily performed in sequence, but may be performed in turn or alternately with another operation or at least some of operations or stages of another operation.

Figure 14:
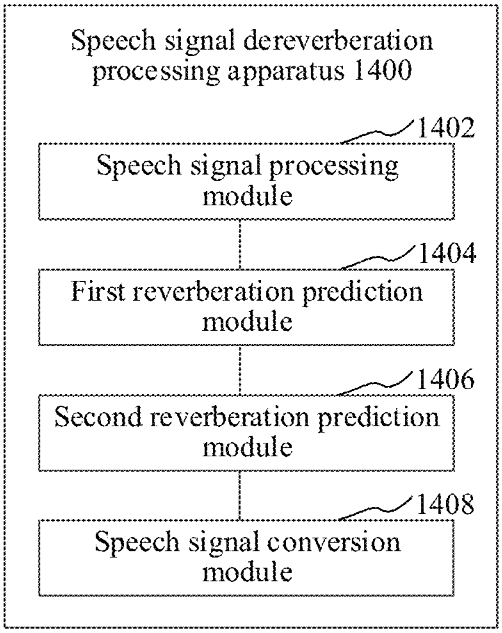
FIG. 14 is a diagram of a speech signal dereverberation processing apparatus according to an embodiment.

FIG. 14 is a diagram of a speech signal dereverberation processing apparatus according to an embodiment. In an embodiment, as shown in FIG. 14, a speech signal dereverberation processing apparatus 1400 is provided. The apparatus may use a software module or a hardware module or a combination thereof and becomes a part of a computer device. The apparatus specifically includes: a speech signal processing module 1402, a first reverberation prediction module 1404, a second reverberation prediction module 1406, and a speech signal conversion module 1408.

The speech signal processing module 1402 is configured to obtain an original speech signal; and extract an amplitude spectrum feature and a phase spectrum feature of a current frame in the original speech signal.

The first reverberation prediction module 1404 is configured to extract subband amplitude spectrums from the amplitude spectrum feature corresponding to the current frame, and determine, according to the subband amplitude spectrums by using a first reverberation predictor, a reverberation strength indicator corresponding to the current frame.

The second reverberation prediction module 1406 is configured to determine, according to the subband amplitude spectrums and the reverberation strength indicator by using a second reverberation predictor, a clean speech subband spectrum corresponding to the current frame.

The speech signal conversion module 1408 is configured to perform signal conversion on the clean speech subband spectrum and the phase spectrum feature corresponding to the current frame, to obtain a dereverberated clean speech signal.

In an embodiment, the first reverberation prediction module 1404 is further configured to predict, by using the first reverberation predictor, a clean speech energy ratio corresponding to the subband amplitude spectrum; and determine, according to the clean speech energy ratio, the reverberation strength indicator corresponding to the current frame.

In an embodiment, the first reverberation prediction module 1404 is further configured to extract a dimension feature of the subband amplitude spectrums by using an input layer of the first reverberation predictor; extract representation information of the subband amplitude spectrums according to the dimension feature by using a prediction layer of the first reverberation predictor, and determine the clean speech energy ratio of the subband amplitude spectrums according to the representation information; and output, by using an output layer of the first reverberation predictor and according to the clean speech energy ratio corresponding to the subband amplitude spectrum, the reverberation strength indicator corresponding to the current frame.

In an embodiment, the second reverberation prediction module 1406 is further configured to determine a posterior signal-to-interference ratio of the current frame according to the amplitude spectrum feature of each speech frame by using the second reverberation predictor; determine a prior signal-to-interference ratio of the current frame according to the posterior signal-to-interference ratio and the reverberation strength indicator; and perform filtering enhancement processing on the subband amplitude spectrums of the current frame based on the prior signal-to-interference ratio, to obtain a clean speech subband amplitude spectrum corresponding to the current frame.

In an embodiment, the second reverberation prediction module 1406 is further configured to extract a steady noise amplitude spectrum corresponding to each subband in the current frame by using the second reverberation predictor; extract a steady reverberation amplitude spectrum corresponding to each subband in the current frame by using the second reverberation predictor; and determine the posterior signal-to-interference ratio of the current frame according to the steady noise amplitude spectrum, the steady reverberation amplitude spectrum, and the subband amplitude spectrum.

In an embodiment, the second reverberation prediction module 1406 is further configured to obtain a clean speech amplitude spectrum of a previous frame; and estimate the posterior signal-to-interference ratio of the current frame based on the clean speech amplitude spectrum of the previous frame and according to the steady noise amplitude spectrum, the steady reverberation amplitude spectrum, and the subband amplitude spectrum.

In an embodiment, the speech signal processing module 1402 is further configured to perform framing and windowing processing on the original speech signal, to obtain the amplitude spectrum feature and the phase spectrum feature corresponding to the current frame in the original speech signal; obtain a preset band coefficient, and perform band division on the amplitude spectrum feature of the current frame according to the band coefficient, to obtain the subband amplitude spectrums corresponding to the current frame.

In an embodiment, the speech signal conversion module 1408 is further configured to: perform inverse constant transform on the clean speech subband spectrum according to a band coefficient, to obtain a clean speech amplitude spectrum corresponding to the current frame; and perform time-to-frequency conversion on the clean speech amplitude spectrum and the phase spectrum feature corresponding to the current frame, to obtain the dereverberated clean speech signal.

Figure 15:
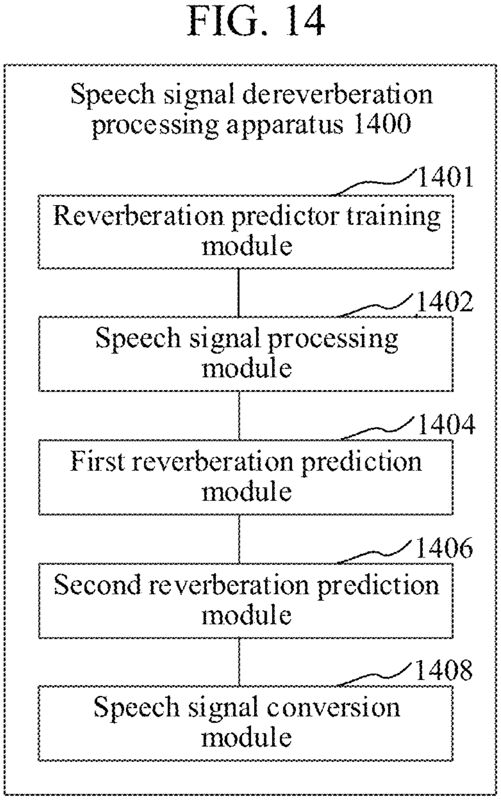
FIG. 15 is a diagram of a speech signal dereverberation processing apparatus according to an embodiment.

FIG. 15 is a diagram of a speech signal dereverberation processing apparatus according to an embodiment. In an embodiment, as shown in FIG. 15, the apparatus further includes a reverberation predictor training module 1401, configured to obtain reverberated speech data and clean speech data, and generate training sample data by using the reverberated speech data and the clean speech data; determine a reverberation-to-clean-speech energy ratio of the reverberated speech data to the clean speech data as a training target; extract a reverberated band amplitude spectrum corresponding to the reverberated speech data, and extract a clean speech band amplitude spectrum of the clean speech data; and train the first reverberation predictor by using the reverberated band amplitude spectrum, the clean speech band amplitude spectrum, and the training target.

In an embodiment, the reverberation predictor training module 1401 is further configured to input the reverberated band amplitude spectrum and the clean speech band amplitude spectrum to a preset network model, to obtain a training result; and adjust a parameter of the preset neural network model based on a difference between the training result and the training target, and continue the training, until a training condition is met, to obtain the required first reverberation predictor.

For specific definition of the speech signal dereverberation processing apparatus, refer to the definition of the foregoing speech signal dereverberation processing method. Some or all of modules of the speech signal dereverberation processing apparatus may be implemented by software, hardware, and a combination thereof. The foregoing modules may be built in or independent of a processor of a computer device in a hardware form, or may be stored in a memory of the computer device in a software form, such that the processor invokes and performs an operation corresponding to each of the foregoing modules.

Figure 16:
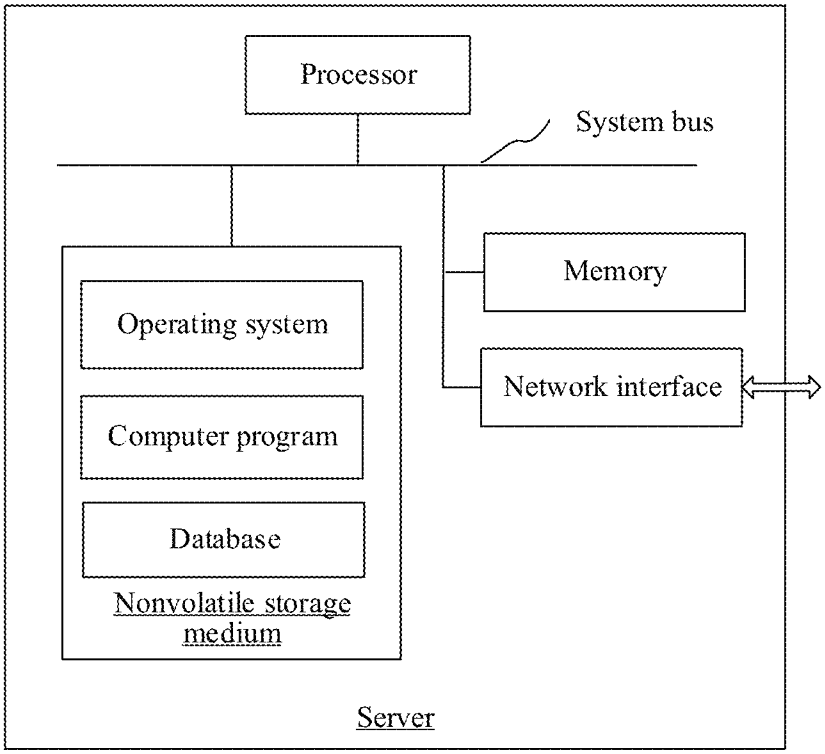
FIG. 16 is a diagram of an internal structure of a computer device according to an embodiment.

FIG. 16 is a diagram of an internal structure of a computer device according to an embodiment. In an embodiment, a computer device is provided. The computer device may be a server, and an internal structure diagram thereof may be shown in FIG. 16. The computer device includes a processor, a memory, and a network interface that are connected by using a system bus. The processor of the computer device is configured to provide computing and control capabilities. The memory of the computer device includes a nonvolatile storage medium and an internal memory. The nonvolatile storage medium stores an operating system, a computer program, and a database. The internal memory provides an environment for running of the operating system and the computer program in the nonvolatile storage medium. The database of the computer device is configured to store speech data. The network interface of the computer device is configured to communicate with an external terminal through a network connection. The computer program is executed by the processor to perform a speech signal dereverberation processing method.

Figure 17:
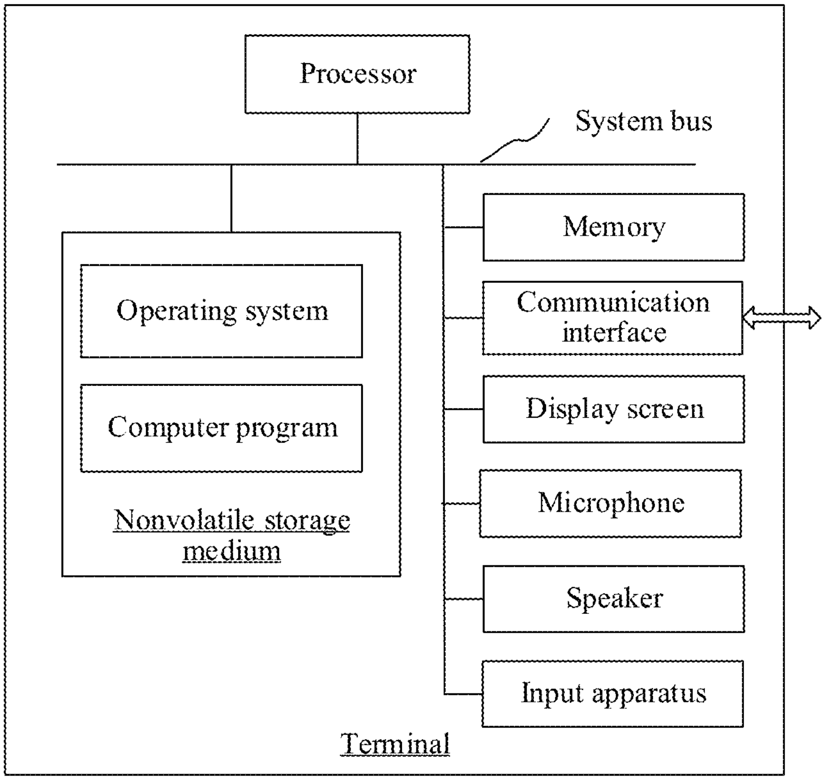
FIG. 17 is a diagram of an internal structure of a computer device according to another embodiment.

FIG. 17 is a diagram of an internal structure of a computer device according to another embodiment. In an embodiment, a computer device is provided. The computer device may be a terminal, and an internal structure diagram thereof may be shown in FIG. 17. The computer device includes a processor, a memory, a communication interface, a display screen, a microphone, a speaker, and an input apparatus that are connected through a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for running of the operating system and the computer program in the nonvolatile storage medium. The communication interface of the computer device is configured to communicate with an external terminal in a wired or wireless manner. The wireless manner may be implemented through WiFi, an operator network, near field communication (NFC), or other technologies. The computer program is executed by the processor to perform a speech signal dereverberation processing method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that the structure shown in FIG. 16 and FIG. 17 is only a block diagram of a partial structure related to the solution of the disclosure, and does not limit the computer device to which the solution of the disclosure is applied. Specifically, the computer device may include more or fewer components than those shown in the figure, or some components may be combined, or different component deployment may be used.

In an embodiment, a computer device is provided, including a memory and a processor, the memory storing a computer program the processor, when executing the computer program, implementing the steps in the foregoing method embodiments.

In an embodiment, a computer-readable storage medium is provided, storing a computer program, the computer program, when executed by a processor, implementing the steps in the foregoing method embodiments.

In an embodiment, a computer program product or a computer-readable instruction is provided, the computer program product or the computer-readable instruction includes computer-readable instructions, and the computer-readable instructions are stored in the computer-readable storage medium. The processor of the computer device reads the computer-readable instructions from the computer-readable storage medium, and the processor executes the computer-readable instructions, to cause the computer device to perform the steps in the method embodiments.

A person of ordinary skill in the art may understand that some or all procedures in the foregoing method embodiments may be implemented by a computer program instructing related hardware. The computer program may be stored in a nonvolatile computer-readable storage medium, and when the computer program is executed, the procedures of the foregoing method embodiments may be performed. Any reference to a memory, a storage, a database, or another medium used in the embodiments provided in the disclosure may include at least one of a nonvolatile memory and a volatile memory. The nonvolatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A speech signal dereverberation processing method, executed by at least one processor, the method comprising:

extracting an amplitude spectrum feature and a phase spectrum feature of a current frame in an original speech signal;

extracting subband amplitude spectrums from the amplitude spectrum feature corresponding to the current frame;

determining, based on the subband amplitude spectrums and a reverberation strength distribution associated with the current frame and by using a first model, a reverberation strength indicator corresponding to the current frame, the first model being a first neural network model that is trained using reverberated band amplitude spectrum, clean speech band amplitude spectrum, and a reverberation-to-clean-speech energy ratio, with the reverberation-to-clean-speech energy ratio used as a training target;

determining, based on the subband amplitude spectrums and the reverberation strength indicator, and by using a second model, a clean speech subband spectrum corresponding to the current frame, wherein the second model is a regressive reverberation strength prediction algorithm model based on a history frame; and obtaining a dereverberated clean speech signal by performing signal conversion on the clean speech subband spectrum and the phase spectrum feature corresponding to the current frame.

2. The method of claim 1, wherein the determining the reverberation strength indicator corresponding to the current frame comprises:

predicting, by using the first model, a clean speech energy ratio corresponding to the subband amplitude spectrums; and determining, based on the clean speech energy ratio and the reverberation strength distribution associated with the current frame, the reverberation strength indicator corresponding to the current frame.

3. The method of claim 2, wherein the predicting the clean speech energy ratio corresponding to the subband amplitude spectrums comprises:

extracting a dimension feature of the subband amplitude spectrums by using an input layer of the first model;

extracting representation information of the subband amplitude spectrums based on the dimension feature and by using a prediction layer of the first model; and determining the clean speech energy ratio of the subband amplitude spectrums based on the representation information; and wherein the determining the reverberation strength indicator corresponding to the current frame comprises:

outputting, by using an output layer of the first model and based on the clean speech energy ratio corresponding to the subband amplitude spectrums, the reverberation strength indicator corresponding to the current frame.

4. The method of claim 1, wherein the determining the clean speech subband spectrum corresponding to the current frame comprises:

determining a posterior signal-to-interference ratio of the current frame based on the amplitude spectrum feature of the current frame and by using the second model;

determining a prior signal-to-interference ratio of the current frame based on the posterior signal-to-interference ratio and the reverberation strength indicator; and obtaining a clean speech subband amplitude spectrum corresponding to the current frame by performing filtering enhancement processing on the subband amplitude spectrums of the current frame based on the prior signal-to-interference ratio.

5. The method of claim 4, wherein the determining the posterior signal-to-interference ratio of the current frame comprises:

extracting a steady noise amplitude spectrum corresponding to each subband in the current frame by using the second model;

extracting a steady reverberation amplitude spectrum corresponding to each subband in the current frame by using the second model; and determining the posterior signal-to-interference ratio of the current frame based on the steady noise amplitude spectrum, the steady reverberation amplitude spectrum, and the subband amplitude spectrums.

6. The method of claim 5, wherein the determining the posterior signal-to-interference ratio of the current frame comprises:

obtaining a clean speech amplitude spectrum of a previous frame; and estimating the posterior signal-to-interference ratio of the current frame based on the clean speech amplitude spectrum of the previous frame and based on the steady noise amplitude spectrum, the steady reverberation amplitude spectrum, and the subband amplitude spectrums.

7. The method of claim 1, wherein the extracting the amplitude spectrum feature and the phase spectrum feature corresponding to the current frame in the original speech signal comprises:

obtaining the amplitude spectrum feature and the phase spectrum feature corresponding to the current frame in the original speech signal by performing framing and windowing processing on the original speech signal; and wherein the extracting subband amplitude spectrums from the amplitude spectrum feature corresponding to the current frame comprises:

obtaining a preset band coefficient; and obtaining the subband amplitude spectrums corresponding to the current frame by performing band division on the amplitude spectrum feature of the current frame based on a band coefficient.

8. The method of claim 1, wherein the obtaining the dereverberated clean speech signal comprises:

obtaining a clean speech amplitude spectrum corresponding to the current frame by performing inverse constant transform on the clean speech subband spectrum according to a preset band coefficient; and obtaining the dereverberated clean speech signal by performing time-to-frequency conversion on the clean speech amplitude spectrum and the phase spectrum feature corresponding to the current frame, to obtain the dereverberated clean speech signal.

9. The method of claim 1, wherein the first model is trained by:

obtaining reverberated speech data and clean speech data corresponding to the reverberated speech data, and generating training sample data by using the reverberated speech data and the clean speech data;

determining the reverberation-to-clean-speech energy ratio of the reverberated speech data to the clean speech data as the training target;

extracting the reverberated band amplitude spectrum corresponding to the reverberated speech data, and extracting the clean speech band amplitude spectrum of the clean speech data; and training the first model by using the reverberated band amplitude spectrum, the clean speech band amplitude spectrum, and the training target.

10. The method of claim 9, wherein the training the first model by using the reverberated band amplitude spectrum, the clean speech band amplitude spectrum, and the training target comprises:

obtaining a training result by inputting the reverberated band amplitude spectrum and the clean speech band amplitude spectrum to a preset network model; and obtaining a required first model by adjusting a parameter of a preset neural network model based on a difference between the training result and the training target, and continuing the training, until a training condition is met.

11. A speech signal dereverberation processing apparatus, comprising:

at least one memory configured to store computer program code; and at least one processor configured to access said computer program code and operate as instructed by said computer program code, said computer program code comprising:

first extracting code configured to cause the at least one processor to extract an amplitude spectrum feature and a phase spectrum feature of a current frame in an original speech signal;

second extracting code configured to cause the at least one processor to extract subband amplitude spectrums from the amplitude spectrum feature corresponding to the current frame;

first determining code configured to cause the at least one processor to determine, based on the subband amplitude spectrums and a reverberation strength distribution associated with the current frame and by using a first model, a reverberation strength indicator corresponding to the current frame, the first model being a first neural network model that is trained using reverberated band amplitude spectrum, clean speech band amplitude spectrum, and a reverberation-to-clean-speech energy ratio, with the reverberation-to-clean-speech energy ratio used as a training target;

second determining code configured to cause the at least one processor to determine, based on the subband amplitude spectrums and the reverberation strength indicator, and by using a second model, a clean speech subband spectrum corresponding to the current frame, wherein the second model is a regressive reverberation strength prediction algorithm model based on a history frame; and obtaining code configured to cause the at least one processor to obtain a dereverberated clean speech signal by performing signal conversion on the clean speech subband spectrum and the phase spectrum feature corresponding to the current frame.

12. The apparatus of claim 11, wherein the first determining code is further configured to cause the at least one processor to:

predict, using the first model, a clean speech energy ratio corresponding to the subband amplitude spectrums; and determine, based on the clean speech energy ratio and the reverberation strength distribution associated with the current frame, the reverberation strength indicator corresponding to the current frame.

13. The apparatus of claim 12, wherein the first determining code is further configured to cause the at least one processor to predict the clean speech energy ratio corresponding to the subband amplitude spectrums by:

extracting a dimension feature of the subband amplitude spectrums by using an input layer of the first model;

extracting representation information of the subband amplitude spectrums based on the dimension feature and by using a prediction layer of the first model; and determining the clean speech energy ratio of the subband amplitude spectrums based on the representation information; and wherein the first determining code is further configured to cause the at least one processor to:

output, using an output layer of the first model and based on the clean speech energy ratio corresponding to the subband amplitude spectrums, the reverberation strength indicator corresponding to the current frame.

14. The apparatus of claim 11, wherein the second determining code is further configured to cause the at least one processor to:

determine a posterior signal-to-interference ratio of the current frame based on the amplitude spectrum feature of the current frame and by using the second model;

determine a prior signal-to-interference ratio of the current frame based on the posterior signal-to-interference ratio and the reverberation strength indicator; and obtain a clean speech subband amplitude spectrum corresponding to the current frame by performing filtering enhancement processing on the subband amplitude spectrums of the current frame based on the prior signal-to-interference ratio.

15. The apparatus of claim 14, wherein the second determining code is further configured to cause the at least one processor to determine the posterior signal-to-interference ratio of the current frame by:

extracting a steady noise amplitude spectrum corresponding to each subband in the current frame by using the second model;

extracting a steady reverberation amplitude spectrum corresponding to each subband in the current frame by using the second model; and determining the posterior signal-to-interference ratio of the current frame based on the steady noise amplitude spectrum, the steady reverberation amplitude spectrum, and the subband amplitude spectrums.

16. The apparatus of claim 15, wherein the second determining code is further configured to cause the at least one processor to determine the posterior signal-to-interference ratio of the current frame by:

obtaining a clean speech amplitude spectrum of a previous frame; and estimating the posterior signal-to-interference ratio of the current frame based on the clean speech amplitude spectrum of the previous frame and based on the steady noise amplitude spectrum, the steady reverberation amplitude spectrum, and the subband amplitude spectrums.

17. The apparatus of claim 11, wherein the first extracting code is further configured to cause the at least one processor to:

obtain the amplitude spectrum feature and the phase spectrum feature corresponding to the current frame in the original speech signal by performing framing and windowing processing on the original speech signal; and wherein the second extracting code is further configured to cause the at least one processor to:

obtain a preset band coefficient; and obtain the subband amplitude spectrums corresponding to the current frame by performing band division on the amplitude spectrum feature of the current frame based on a band coefficient.

18. The apparatus of claim 11, wherein the obtaining code is further configured to cause the at least one processor to:

obtain a clean speech amplitude spectrum corresponding to the current frame by performing inverse constant transform on the clean speech subband spectrum according to a preset band coefficient; and obtain the dereverberated clean speech signal by performing time-to-frequency conversion on the clean speech amplitude spectrum and the phase spectrum feature corresponding to the current frame, to obtain the dereverberated clean speech signal.

19. The apparatus of claim 11, wherein the first model is trained by:

obtaining reverberated speech data and clean speech data, and generating training sample data by using the reverberated speech data and the clean speech data;

determining the reverberation-to-clean-speech energy ratio of the reverberated speech data to the clean speech data as the training target;

extracting the reverberated band amplitude spectrum corresponding to the reverberated speech data, and extracting the clean speech band amplitude spectrum of the clean speech data; and training the first model by using the reverberated band amplitude spectrum, the clean speech band amplitude spectrum, and the training target.

20. A non-transitory computer-readable storage medium storing computer instructions that, when executed by at least one processor of a speech signal dereverberation processing device, cause the at least one processor to:

extract an amplitude spectrum feature and a phase spectrum feature of a current frame in an original speech signal;

extract subband amplitude spectrums from the amplitude spectrum feature corresponding to the current frame;

determine, based on the subband amplitude spectrums and a reverberation strength distribution associated with the current frame and by using a first model, a reverberation strength indicator corresponding to the current frame, wherein the first model is a first neural network model that is trained using reverberated band amplitude spectrum, clean speech band amplitude spectrum, and a reverberation-to-clean-speech energy ratio, with the reverberation-to-clean-speech energy ratio used as a training target;

determine, based on the subband amplitude spectrums and the reverberation strength indicator, and by using a second model, a clean speech subband spectrum corresponding to the current frame, wherein the second model is a regressive reverberation strength prediction algorithm model based on a history frame; and obtain a dereverberated clean speech signal by performing signal conversion on the clean speech subband spectrum and the phase spectrum feature corresponding to the current frame.

* * * * *